US 7,690,377 B2

(12) United States Patent
Goldman et al.

(10) Patent No.: US 7,690,377 B2
(45) Date of Patent: Apr. 6, 2010

(54) HIGH TEMPERATURE SOLAR RECEIVER

(75) Inventors: Arnold Goldman, Jerusalem (IL); Arieh Meitav, Rishon Lezion (IL); Ilia Yakupov, Rehovot (IL); Israel Kroizer, Jerusalem (IL); Yuri Kokotov, Ma'aleh Adumim (IL); Yoel Gilon, Jerusalem (IL)

(73) Assignee: BrightSource Energy, Inc., Oakland, CA (US)

( * ) Notice: Subject to any disclaimer, the term of this patent is extended or adjusted under 35 U.S.C. 154(b) by 0 days.

(21) Appl. No.: 11/747,595

(22) Filed: May 11, 2007

(65) Prior Publication Data

US 2008/0011290 A1 Jan. 17, 2008

Related U.S. Application Data

(60) Provisional application No. 60/747,087, filed on May 11, 2006.

(51) Int. Cl.
*F24J 2/24* (2006.01)
(52) U.S. Cl. .................. 126/655; 126/651; 126/652
(58) Field of Classification Search .............. 126/655, 126/634, 651, 652, 595, 628, 631, 643, 629
See application file for complete search history.

(56) References Cited

U.S. PATENT DOCUMENTS

| | | | | |
|---|---|---|---|---|
| 1,015,131 A | * | 1/1912 | Bone et al. ................ 122/421 |
| 3,921,711 A | * | 11/1975 | Westbrock .............. 165/109.1 |
| 4,015,584 A | * | 4/1977 | Haberman ................. 126/600 |
| 4,055,948 A | * | 11/1977 | Kraus et al. ............... 60/641.8 |
| 4,117,682 A | * | 10/1978 | Smith ....................... 60/641.8 |
| 4,119,083 A | * | 10/1978 | Heyen et al. .............. 126/674 |
| 4,129,117 A | * | 12/1978 | Harvey ..................... 126/655 |
| 4,132,217 A | * | 1/1979 | Rom et al. ................. 126/675 |
| 4,136,674 A | * | 1/1979 | Korr ......................... 126/607 |
| 4,137,899 A | * | 2/1979 | Weslow ..................... 126/649 |
| 4,164,123 A | * | 8/1979 | Smith ...................... 60/641.11 |
| 4,190,037 A | * | 2/1980 | Niedermeyer ............. 126/655 |
| 4,197,830 A | * | 4/1980 | Wilson ...................... 126/620 |
| 4,205,656 A | * | 6/1980 | Scarlata .................... 126/400 |
| 4,210,126 A | * | 7/1980 | Kellberg et al. ........... 126/655 |

(Continued)

FOREIGN PATENT DOCUMENTS

DE       2828118 A  *  1/1980

(Continued)

OTHER PUBLICATIONS

Optimization of bed parameters for packed bed solar energy collection system B. Paul a, , J.S. Saini b Renewable Energy 29 (2004) 1863-1876 Received Oct. 10, 2002; accepted Jan. 28, 2004.*

*Primary Examiner*—Kenneth B Rinehart
*Assistant Examiner*—Jorge Pereiro
(74) *Attorney, Agent, or Firm*—Mark A. Catan, Esq.; Miles & Stockbridge, PC

(57) ABSTRACT

The invention provides receivers which can be used to heat a working fluid to high temperature. In preferred embodiments, concentrated solar radiation is received and converted to heat at varying depths in the receiver such that multiple layers of surface are used to heat the working fluid. In addition, the depth-loading configuration helps to trap received heat to reduce radiant thermal loss.

14 Claims, 21 Drawing Sheets

U.S. PATENT DOCUMENTS

| | | | | | |
|---|---|---|---|---|---|
| 4,215,673 | A | * | 8/1980 | Cohen | 126/587 |
| 4,227,515 | A | * | 10/1980 | Jacob et al. | 126/592 |
| 4,236,506 | A | * | 12/1980 | Roark | 126/657 |
| 4,237,867 | A | * | 12/1980 | Bauer | 126/650 |
| 4,239,035 | A | * | 12/1980 | Brooks et al. | 126/678 |
| 4,244,354 | A | * | 1/1981 | Williams | 126/664 |
| 4,245,618 | A | * | 1/1981 | Wiener | 126/643 |
| 4,245,693 | A | * | 1/1981 | Cheng | 165/104.16 |
| 4,262,653 | A | * | 4/1981 | Holland | 126/400 |
| 4,273,101 | A | * | 6/1981 | Merges | 126/643 |
| 4,299,203 | A | * | 11/1981 | Skopp | 126/638 |
| 4,303,061 | A | * | 12/1981 | Torobin | 126/708 |
| 4,314,549 | A | * | 2/1982 | Swanson | 126/674 |
| 4,315,500 | A | * | 2/1982 | Gonder | 126/567 |
| 4,320,246 | A | * | 3/1982 | Russell | 136/248 |
| 4,324,230 | A | * | 4/1982 | Lunsford | 126/655 |
| 4,333,445 | A | * | 6/1982 | Lee | 126/617 |
| 4,338,919 | A | * | 7/1982 | Hwang | 126/644 |
| 4,342,307 | A | * | 8/1982 | Tuck | 126/674 |
| 4,355,627 | A | * | 10/1982 | Scarlata | 126/400 |
| 4,397,304 | A | * | 8/1983 | Villain | 126/593 |
| 4,401,106 | A | * | 8/1983 | Binner | 126/629 |
| 4,416,257 | A | * | 11/1983 | Bale | 126/610 |
| 4,418,685 | A | * | 12/1983 | Frazier | 126/628 |
| 4,421,097 | A | * | 12/1983 | Meckler | 126/598 |
| 4,421,102 | A | * | 12/1983 | Posnansky et al. | 126/647 |
| 4,474,169 | A | * | 10/1984 | Steutermann | 126/592 |
| 4,485,803 | A | * | 12/1984 | Wiener | 126/591 |
| 4,488,539 | A | * | 12/1984 | Lucassen | 126/635 |
| 4,513,733 | A | * | 4/1985 | Braun | 126/643 |
| 4,522,252 | A | * | 6/1985 | Klaren | 165/104.16 |
| 4,523,576 | A | * | 6/1985 | Waschow | 126/586 |
| 4,524,758 | A | * | 6/1985 | Mori | 126/606 |
| 4,548,196 | A | * | 10/1985 | Torobin | 126/654 |
| 4,593,754 | A | * | 6/1986 | Holl | 165/109.1 |
| 4,601,282 | A | * | 7/1986 | Mountain | 126/574 |
| 4,676,068 | A | * | 6/1987 | Funk | 60/641.14 |
| 4,759,404 | A | * | 7/1988 | Henson et al. | 165/104.13 |
| 4,848,087 | A | * | 7/1989 | Parker et al. | 60/641.15 |
| 4,869,234 | A | * | 9/1989 | Rapozo | 126/656 |
| 4,974,127 | A | * | 11/1990 | Foley | 362/96 |
| 4,993,403 | A | * | 2/1991 | Downs et al. | 126/649 |
| 5,500,054 | A | * | 3/1996 | Goldstein | 136/253 |
| 5,572,987 | A | * | 11/1996 | Moratalla et al. | 126/652 |
| 5,572,988 | A | * | 11/1996 | Walton | 126/652 |
| 5,866,752 | A | * | 2/1999 | Goozner | 204/157.3 |
| 5,894,836 | A | * | 4/1999 | Wu et al. | 126/617 |
| 6,372,978 | B1 | * | 4/2002 | Cifaldi | 136/248 |
| 6,689,950 | B2 | * | 2/2004 | Cordaro | 136/250 |
| 6,698,501 | B2 | * | 3/2004 | Fleischman | 165/104.16 |
| 6,722,358 | B2 | * | 4/2004 | Rhodes | 126/655 |
| 6,776,154 | B2 | * | 8/2004 | Yogev | 126/639 |
| 6,931,851 | B2 | * | 8/2005 | Litwin | 60/641.11 |
| 2002/0197520 | A1 | * | 12/2002 | Quick et al. | 429/32 |
| 2004/0244382 | A1 | * | 12/2004 | Hagen et al. | 60/775 |
| 2005/0056313 | A1 | * | 3/2005 | Hagen et al. | 137/3 |

FOREIGN PATENT DOCUMENTS

EP           41943 A   *   12/1981

* cited by examiner

HIGH TEMPERATURE SOLAR RECEIVER

CROSS REFERENCE TO RELATED APPLICATIONS

This application claims priority to U.S. provisional patent application Ser. No. 60/747,087 filed 11 May 2006, which expires May 11, 2007.

FIELD OF THE INVENTION

This invention relates to the conversion of solar radiation to electric power and devices therefor, as well as related processes, components, articles of manufacture, and other technological improvements.

BACKGROUND

The generation of electric power from thermal energy absorbed from solar radiation has been proposed as an alternative or complementary technological approach to the burning of fossil fuels, with societal benefits accruing from reduction in emissions from combustion, from reduced reliance on limited nonrenewable resources, and from the alleviation of political and ecological problems associated with the procurement and distribution of fossil fuels.

Efficient utilization of the solar radiation resource is deemed necessary if solar electric power plants are to approach cost effectiveness relative to fossil fuel combustion plants. Systems based on cylindrical parabolic trough mirrors such as those which were built in the Mojave Desert in California in the 1980s were financially successful because of governmental subsidies in the form of tax breaks and preferential electricity tariffs, but suffer from relatively low conversion efficiencies both because of the necessity to invest significant energy in the circulation of a synthetic oil used as the working fluid for heat absorption, and because of the relatively low thermodynamic efficiency of the Rankine cycle at the moderate maximum temperatures allowed by the synthetic oil. A solar thermal electric configuration with higher efficiency of solar-to-electric conversion has been proposed in the form of a central power tower system in which steam is generated and superheated in a central receiver by solar radiation reflected thereupon by fields of heliostats. This system overcomes the aforementioned deficiencies of the parabolic trough technology by foregoing an intermediate working fluid and obviating the need for energy-intensive circulation, as well as by producing steam at a higher temperature which yields a higher thermal efficiency in a Rankine cycle steam turbine. It has been further proposed to construct a central solar power tower system in which the working fluid is compressed air, where the solar-heated compressed air is later used in a Brayton cycle gas turbine in place of compressed air heated by combustion of a fuel, with the possibility of further improving the overall efficiency of the system by adding, for example, a heat recovery steam generator and a Rankine cycle steam turbine in a combined-cycle configuration. One problem encountered in the development of such a solar power tower system is the lack of availability of a solar receiver that can effectively heat a pressurized working fluid such as compressed air to the input temperature of a gas turbine, in the neighborhood of 1500° K.

SUMMARY OF THE INVENTION

Briefly, the invention provides receivers which can be used to heat a working fluid to high temperature. In preferred embodiments, concentrated solar radiation is received and converted to heat at varying depths in the receiver such that multiple layers of surface are used to heat the working fluid. In addition, the depth-loading configuration helps to trap received heat to reduce radiant thermal loss.

According to an embodiment, the invention provides solar receiver with a plurality of elements in at least one optically transparent housing where the elements are partly optically transparent. A plurality of ports are connected to the at least one housing and defining at least one sealed fluid channel connecting respective ones of the plurality of ports such that the plurality of elements lie along the at least one sealed fluid channel. In an embodiment, the elements are solid. Preferably, at least some of the elements are at least partially optically transparent. The elements may be randomly arranged in a bed within the at least one housing. The elements may be of, for example, sapphire. The at least one housing may include a plurality of tubes. The at least one housing may include an array of tubes arranged to permit light to be focused thereon from a range of azimuthal angles cumulatively totaling at least 180 degrees.

The at least one housing preferably includes an array of tubes arranged to permit light to be focused thereon from a range of azimuthal angles totaling 360 degrees. The plurality of elements may include a fluidized bed.

According to another embodiment, an array of tubes, at least some of which are at least partially transparent, have inlet and outlet portions such that the tubes in the array define a flow channel between the inlet and outlet portions. The tubes are arranged such that concentrated light entering a first of the tubes passes therethrough and is absorbed by a second of the tubes. Preferably, the array includes several layers of tubes. Preferably, also, he array defines a generally cylindrical arrangement of tubes. Preferably, all of the tubes are at least partially transparent or translucent. The array may include several layers of tubes wherein at least one layer has a higher absorption rate of solar radiation than at least one other layer. The tubes may be of sapphire.

Each of the tubes may be connected to an inlet flow header and an outlet flow header. Some of the tubes may be opaque. Some of the tubes may be reinforced with reinforcing winds.

According to another embodiment, a solar receiver has a receiver portion having an array of tubes, at least some of which are at least partially transparent, having inlet and outlet portions such that the tubes in the array define a first flow channel between the first inlet and outlet portions for conveying a working fluid. A second flow channel in thermal contact with the tubes has a second inlet and outlet portions for conveying a cooling fluid. A controller is preferably provided and configured to detect temperatures of the tubes and to control the flow of cooling fluid responsively thereto.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DESCRIPTION OF THE EMBODIMENTS

Figure 1:
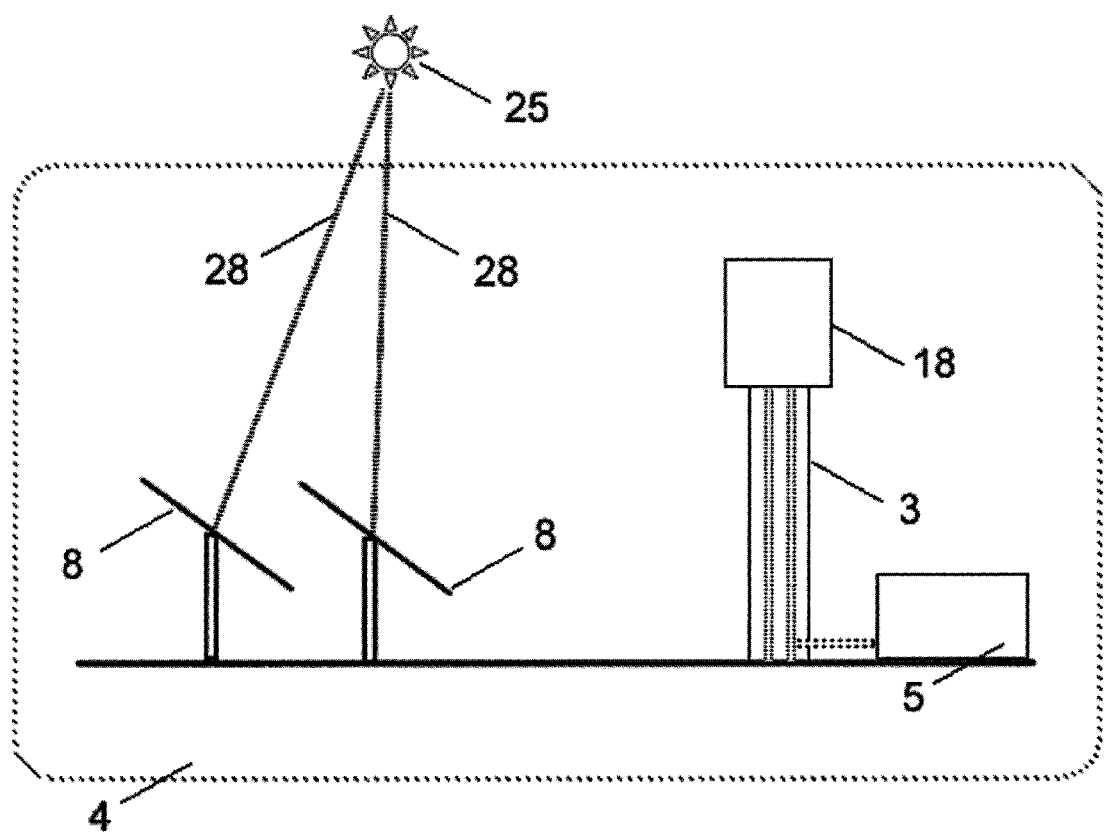
FIGS. 1 and 2 are diagrammatic views of a plurality of heliostats and a central power tower in accordance with two embodiments of the invention.
Figure 2:
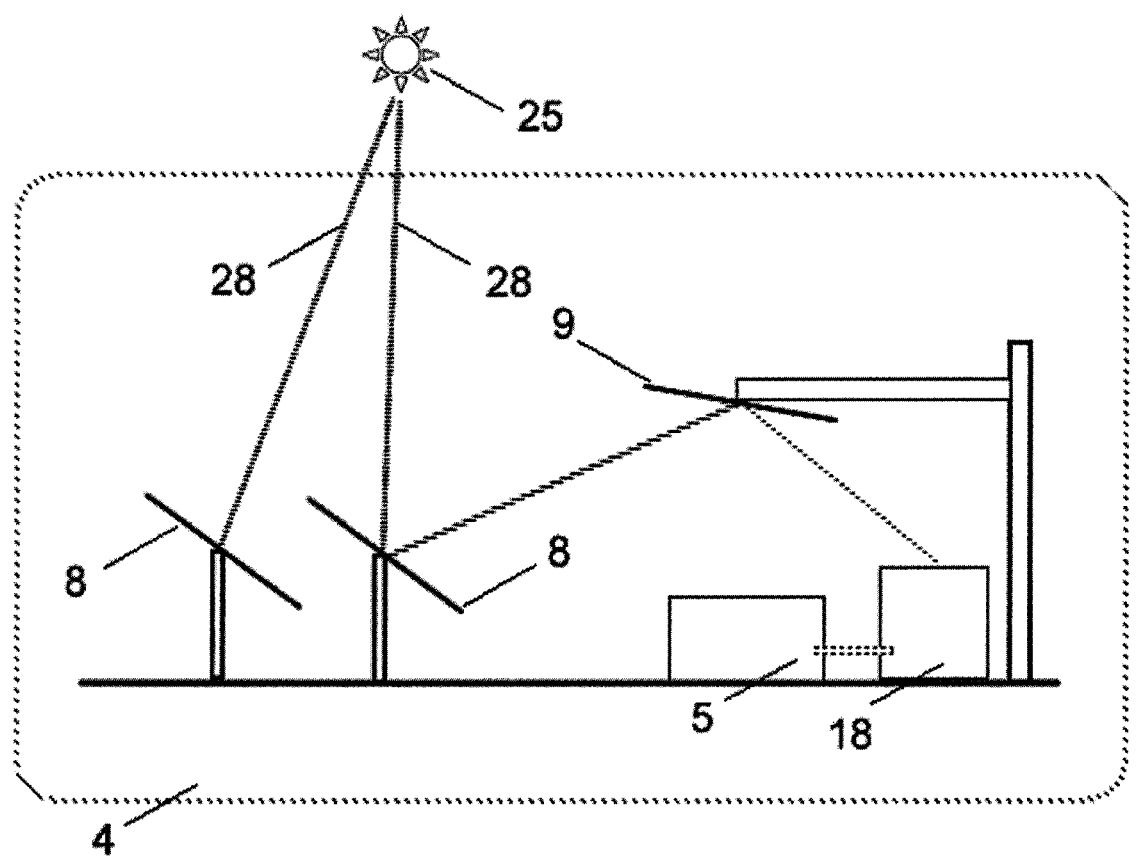

FIG. 1 shows a solar power system 4 in which heliostat-mounted mirrors 8 reflect incident solar radiation 28 onto a receiver 18 in which a working fluid (not shown) is heated for later use in an electric power generating plant 5. The heliostat-mounted mirrors 8 are capable of tracking the apparent movement of the sun 25 across the sky each day in order to maintain the reflective focus in the direction of the receiver 18 as the angle of the incident radiation 28 changes. The receiver 18 is located atop a tower 3, or in an alternative embodiment, shown in FIG. 2, is located on the ground, and the heliostat-mounted mirrors 8 reflect solar radiation onto one or more mirrors 9 which further reflect the radiation onto the receiver 18.

A receiver receives light both near its surface and deeper within. By progressively absorbing the light and converting it to heat energy both near the surface and deeper within the receiver, the energy can be captured and transferred to a working fluid using multiple layers of surfaces at multiple depths within the receiver without increasing the aperture through which the concentrated sunlight passes into the receiver. In addition, at least some of the light energy, in order to escape, must pass through multiple layers of material in order escape, so such a depth-loading receiver can serve, to an extent, as a light.

In embodiments, the receiver preferably has elements with partially light-absorbing properties whose surfaces transfer heat from absorbed sunlight to a working fluid. The elements are provided in multiple layers both near the surface and deeper within the receiver. In addition, or alternatively, the solar radiation is absorbed directly by the working fluid which is conveyed through one or more channels defined by transparent elements. Thus, in embodiments, light is absorbed both by solid absorbing elements and a working fluid, at multiple depths in the receiver. The above features are provided by various example embodiments as described presently.

In an embodiment, transparent, translucent, and/or partially opaque elements 47 are arranged in a bed about which a working fluid flows as shown in FIGS. 3-6b. The elements may take the form of solid bodies or pellets of any desired shape which absorb and/or transmit the radiant energy reflected by heliostats and transfer absorbed optical energy to the working fluid. The working fluid and the elements are preferably contained in a pressure conduit with windows to permit solar radiation to enter. One or more pressure conduits may be provided to form, essentially, an array of multiple receivers located at the same focal area with the bed of elements therewithin and operating as a single receiver such as illustrated in FIG. 7. The elements may be treated to obtain a desired solar energy absorption rate. In addition, the pressure conduits may be so treated to obtain a selected absorption rate. This may be done by surface treatment, dying the material, impregnating or printing, or any other suitable means. An example of a material that may be used is sapphire, known chemically as aluminum oxide ($Al_2O_3$) has a melting point of 2313° K., and with an energy gap of 9.1 eV permits optical transmission with minimal absorption in the range 0.25 to 5.0 microns. A second example of a material that may be used is a nanocrystalline or polycrystalline ceramic, such as magnesium aluminate (MgAl2O4).

In an embodiment, consistent with the multiple pressure conduit embodiment described above, transparent, translucent, and/or partially opaque tubes are provided which convey the working fluid through them. In this case, an outer pressure conduit is preferably not used to surround the receiver light absorbing elements since the tubes can compensate for the pressure. Preferably, the tubes are provided in more than a single radial layer.

In one or more embodiments as described herein, the working fluid is air. In one or more embodiments, the working fluid is an intermediate fluid which transfers heat to another fluid that is used for operating a prime mover, such as a Brayton cycle engine.

The working fluid conveyed through the receiver may contain an aerosol to enhance its absorptivity. Alternatively, the working fluid may fluidize one or more beds of larger light-absorbing particles which remain in the receiver.

In one embodiment of the invention, light absorption by at least some of the transparent, translucent, and/or at least partially opaque elements is enhanced by partially coating them with a light-absorbing medium, or, in an alternative embodiment, by surface treatment such as etching, pitting, or embedding of small amounts of a light-absorbing medium. In other embodiments, transparent, translucent, and/or at least partially opaque elements are treated with an anti-reflective coating to improve optical transmission through the receiver.

Thermal energy absorbed by the transparent, translucent, and/or at least partially opaque elements is effectively transferred to a pressurized working fluid flowing into and from the receiver, where it comes into contact with them. The pressurized working fluid may additionally absorb heat directly from reflected solar radiation, but this direct heating of the fluid is not necessarily the principal source of thermal energy used to heat the fluid.

Figure 3:
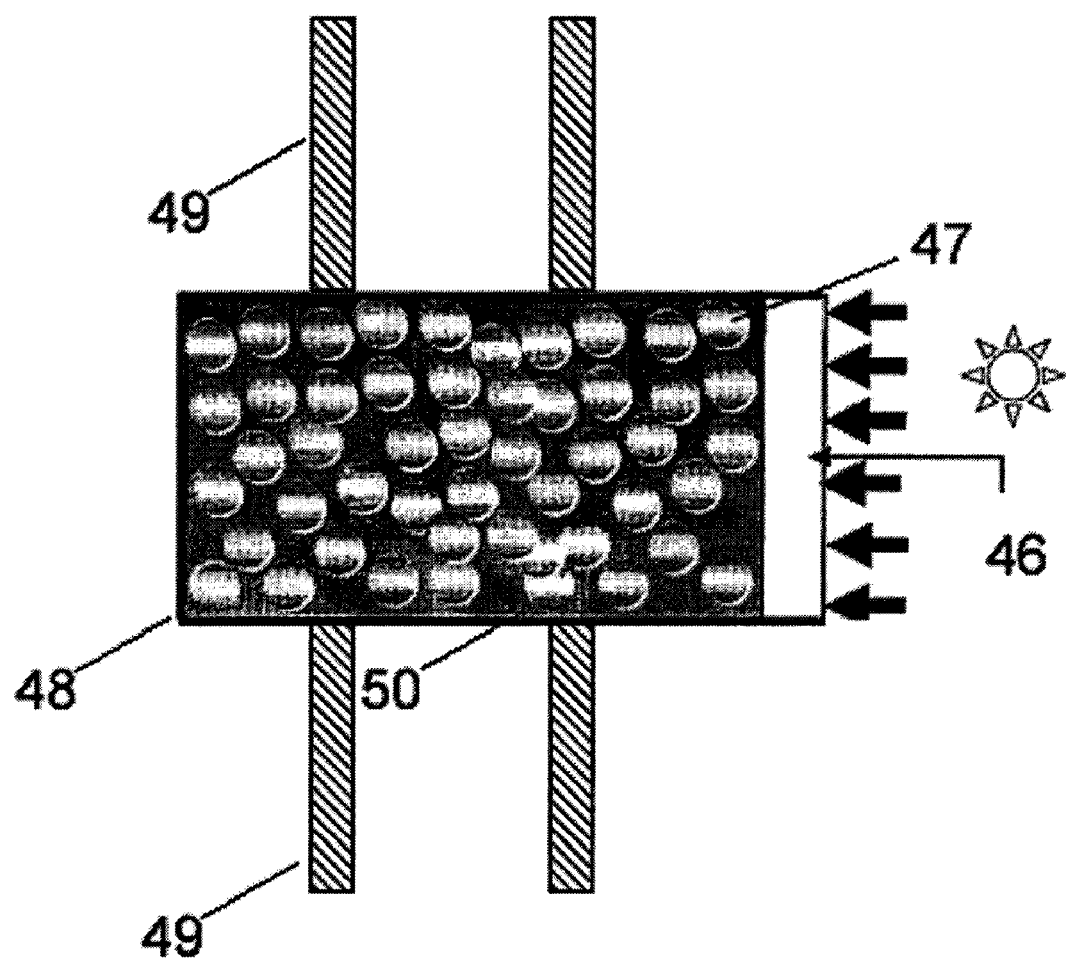
FIGS. 3, 4 and 5 show partial cross-section views of a receiver containing a bed of transparent, translucent, and/or at least partially opaque elements in accordance with various embodiments.

In accordance with an embodiment shown in FIG. 3, a bed of transparent, translucent, and/or at least partially opaque elements 47 is provided in a conduit 48. The elements 47 may be in the form of balls, tubes, cylinders, disks, or other shapes. The interior of the conduit is in fluid communication with conduits or pipes 49 through which a pressurized working fluid (not shown) is introduced into the conduit 48 and evacuated therefrom. The conduit 48 additionally includes a window 46 to allow reflected solar radiation to enter and optionally includes reflective walls 50 to retain the light within the confines of the conduit 48. In another embodiment, the walls 50 of the conduit 48 (excluding the window 46 where the light enters) are constructed of a thermally insulating material. The conduit 48 can be of various shapes including a cone, a polyhedron such as a prism or pyramid, or a spherical, conical or pyramidal frustum, or cylinder. In the case that tapering shape such as a cone, pyramid or frustum is selected, the window may be the conical surface or pyramidal faces or the base surface. One advantage of an inverted pyramidal or conical window is that the light entry surface (normal) can be directed toward the heliostats arranged around it to minimize the angle of incidence and thereby minimize reflection at the incident surface of the receiver window.

In an embodiment, the (partially) light absorbing elements are shaped, sized, and distributed to form a bed of substantially uniform density such as to prevent a "short-circuit" flow in the bed due to non-uniform spacing.

Preferably, the absorption rate of the elements and the arrangement thereof are such that the amount of light energy absorbed at each point within the receiver is constant. Thus, for example, the elements near the entry window of the receiver are more transmissive to light than those near the center of the receiver. That is, as the incident concentrated light loses intensity progressively as it passes into the receiver, the amount of energy absorbed by each element tends to be constant such that the heat transfer surfaces of the elements are used efficiently. As such, the elements toward the interior of the receiver may be opaque or nearly so while those near the window are the most transmissive. In any of the embodiments described herein, the elements and/or window may be treated with an antireflective coating to reduce reflection.

Figure 4:
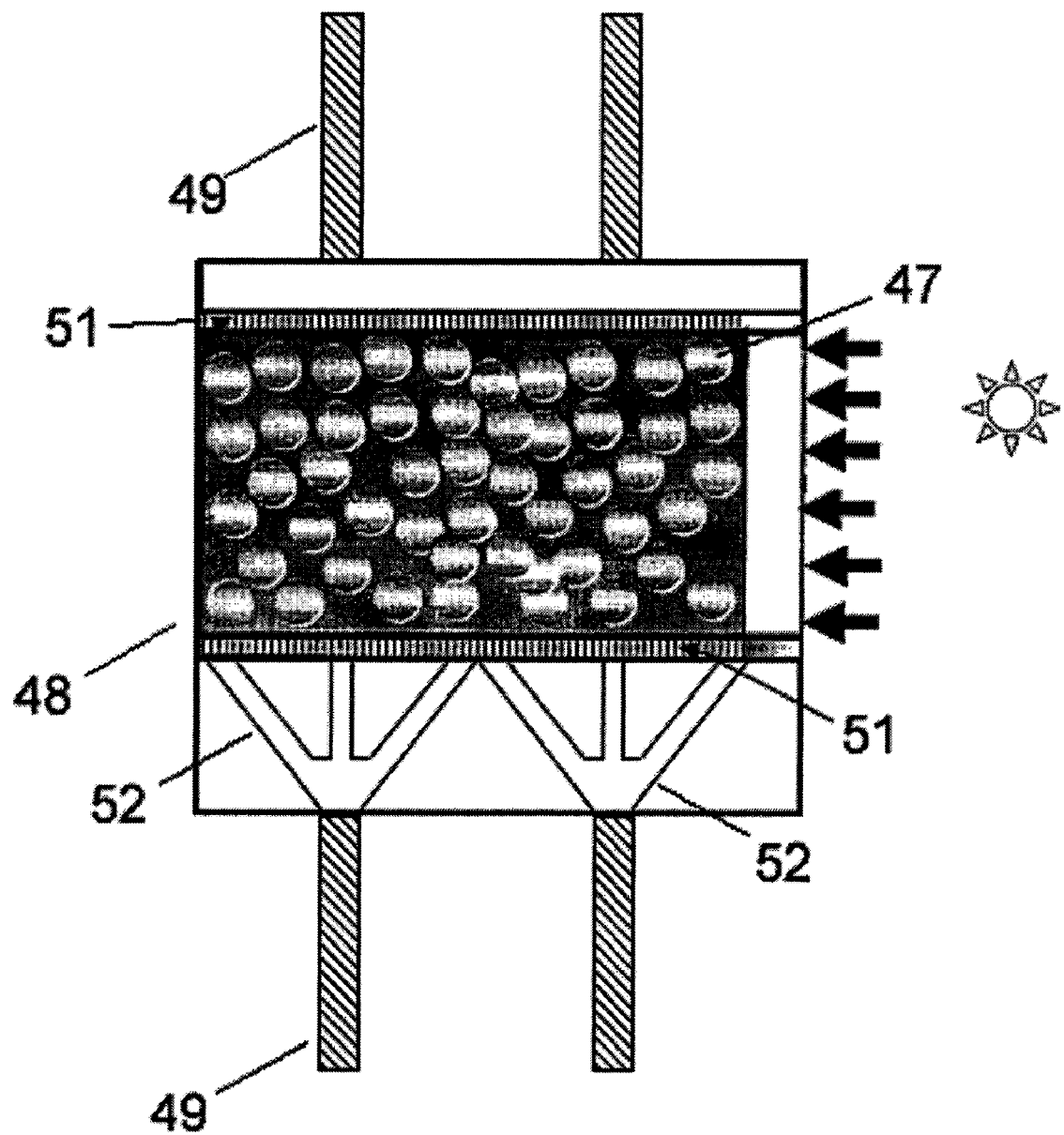

FIG. 4 shows, as an example, an embodiment in which transparent, translucent, and/or at least partially opaque elements 47 are held in place between screens 51 within the interior volume of the conduit. Screens 51 are configured to have holes smaller than the elements 47 and are made of a high temperature material such as ceramic or high temperature alloys or titanium. The figure shows a case wherein a bed of elements 47 is held between a single pair of screens 51 transverse to the direction of fluid flow, but in other embodiments more screens are provided in parallel planes to the first two, and transparent, translucent, and/or at least partially opaque elements are held in place between each two adjacent screens. In some embodiments manifolds 52 or pipe headers are provided to make fluid delivery more uniform. In embodiments fluid flow may be in other directions, including horizontal or diagonal.

Figure 5:
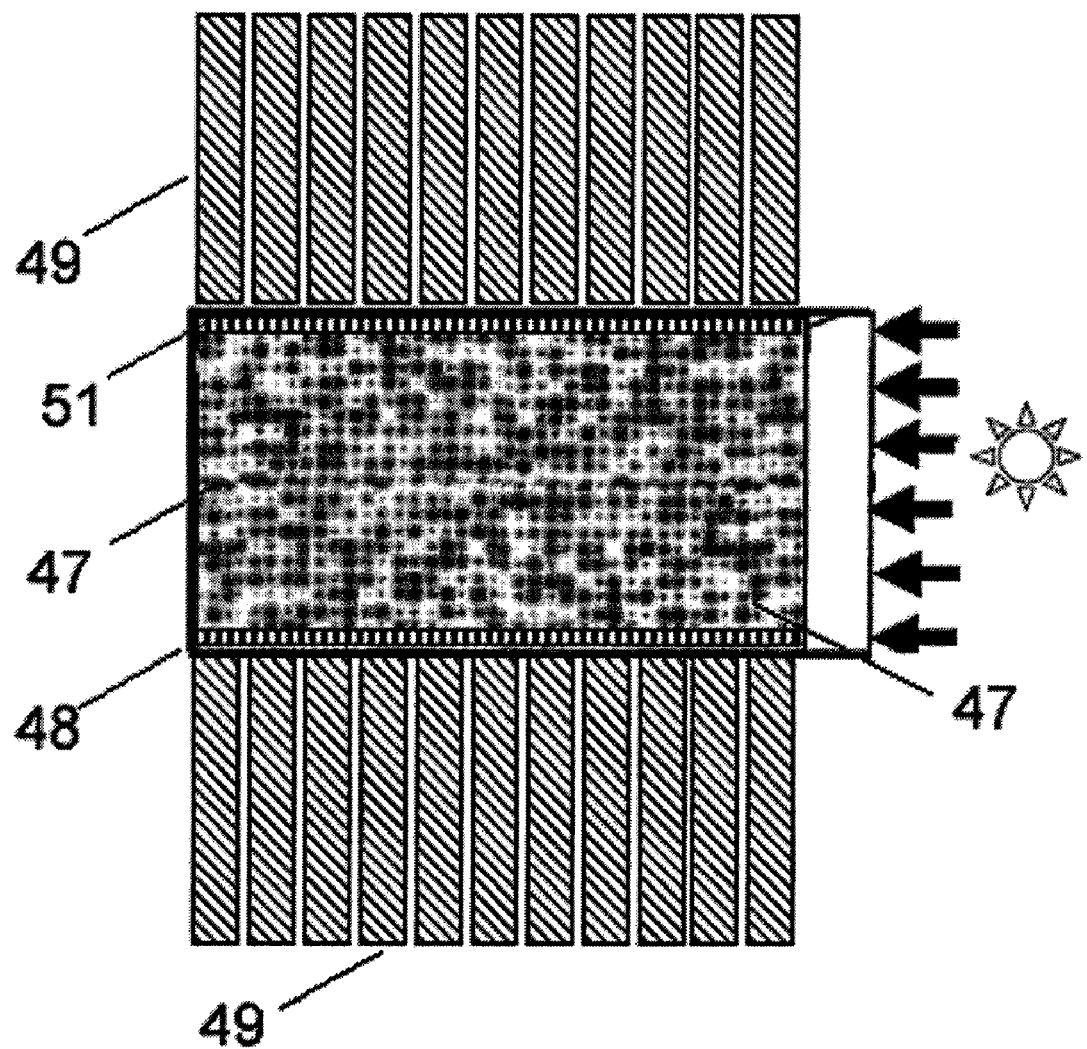

FIG. 5 shows another embodiment in which elements 47 are fluidized by the upwardly directed flow of working fluid. In an embodiment, airflow is maintained at a rate which maintains incipient fluidization, minimizing agitation and avoiding channeling, spouting, layering or similar undesirable effects. Screens 51 below the bed support the elements 47 to retain them in the receiver. Preferably, the transparent, translucent, and/or at least partially opaque elements 47 are smaller than those described in the preceding embodiments and the screens 51 are configured accordingly.

Figure 6A:
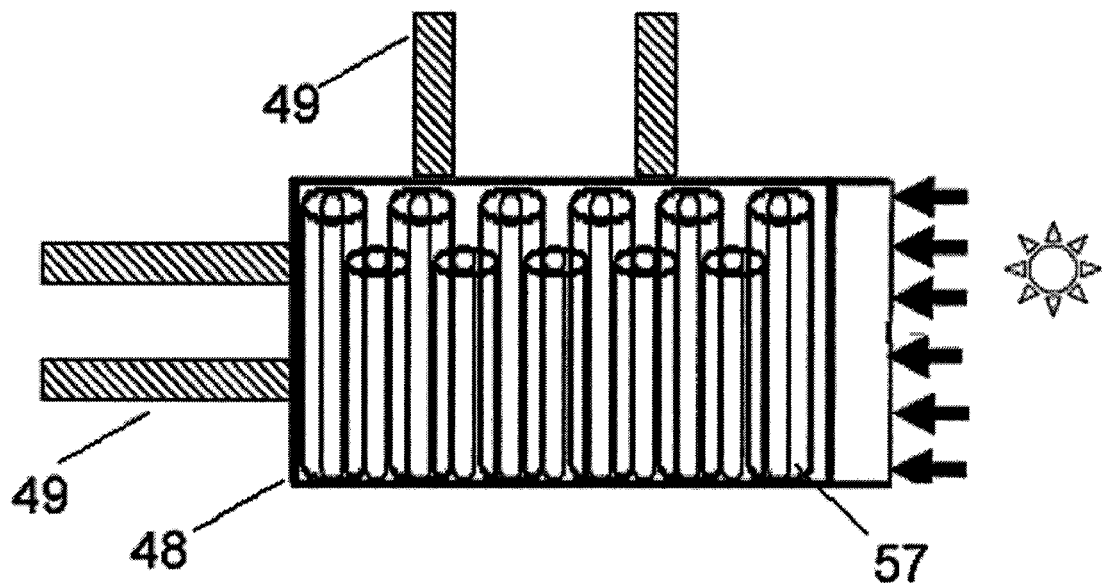
FIG. 6a is a partial cross-section view of a receiver containing fixedly positioned heat-absorbing transparent, translucent, and/or at least partially opaque tubes in accordance with another embodiment.
Figure 7:
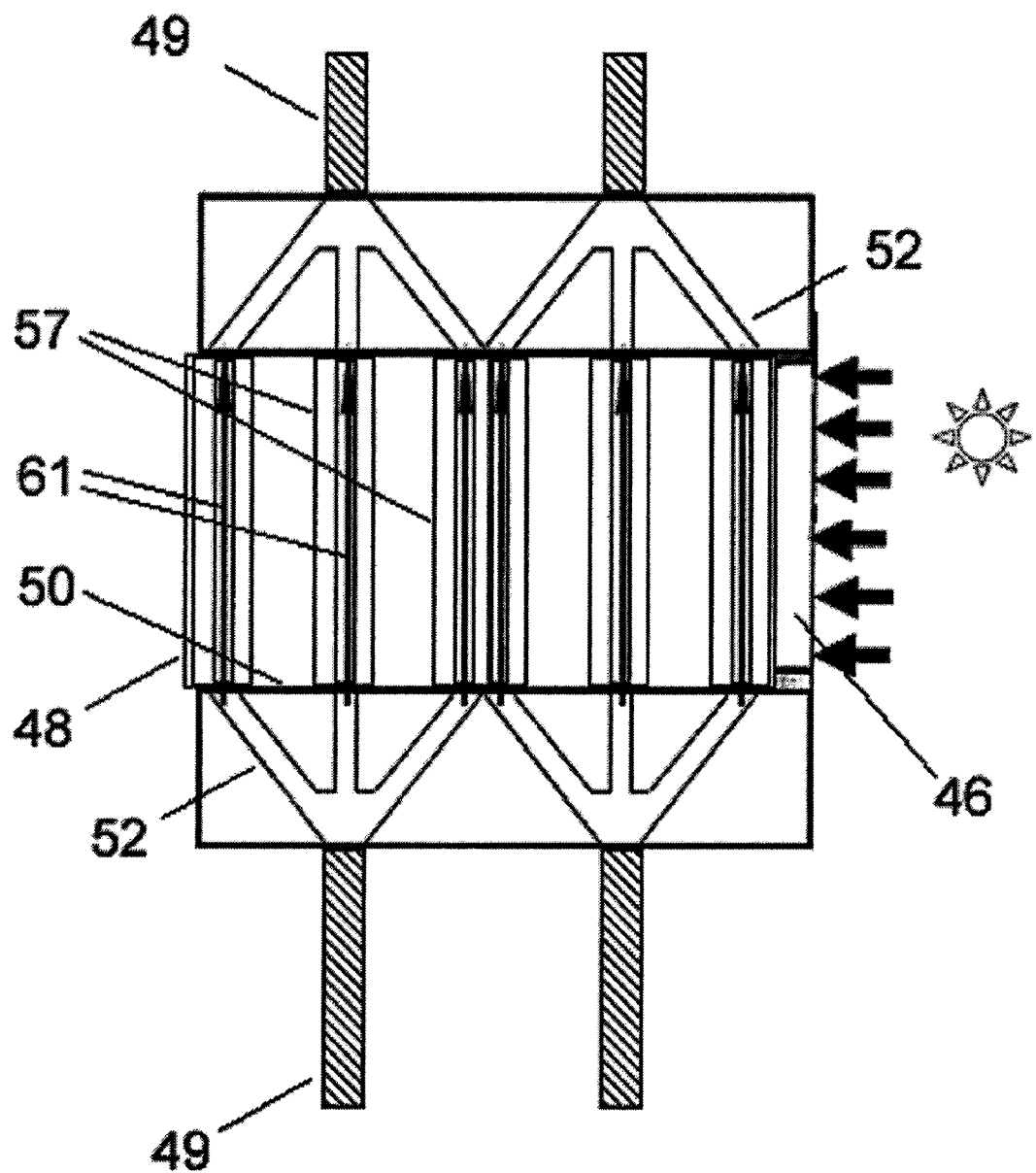
FIG. 7 is another partial cross-section view of a receiver that includes transparent, translucent, and/or at least partially opaque tubes.

In an example shown in FIG. 6a, transparent, translucent, and/or at least partially opaque elements 57 are arranged in a regular array in a pressure conduit 48. In an example embodiment the elements 57 are tubes, but they could be any suitable shape. A pressurized working fluid (not shown) is made to flow through the interior volume of the conduit 48 and absorb heat from the tubes 57. In this embodiment, the elements 57 are preferably arranged in multiple layers such that solar energy absorption at each layer is relatively constant such that the heat transfer surface provided by the elements 57 is efficiently utilized. Inlet and outlet conduits 49 are shown and can be arranged in any suitable configuration to supply working fluid to the pressure conduit 48.

Figure 6B:
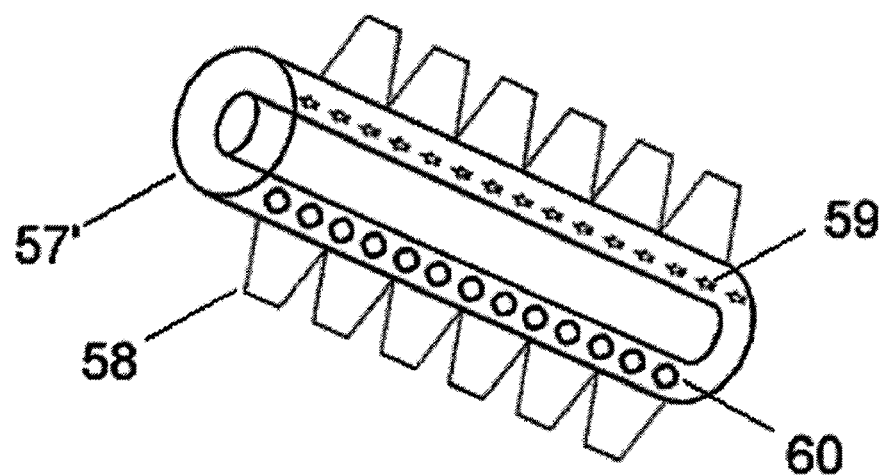
FIG. 6b shows a transparent, translucent, and/or at least partially opaque tube according to another embodiment.

FIG. 6b illustrates a radiation-absorbing element that may be used with any of the foregoing embodiments which has surface augmentation to enhance the heat transfer from the element to the working fluid. Features such as fins 58, pits 59, spines, and holes 60, or any combination, may be used to increase the surface area of the tubes and enhance convective heat transfer from the tubes to the working fluid.

A further receiver embodiment shown in FIG. 7, has a plurality of transparent, translucent, and/or at least partially opaque tubes 57 which absorb solar radiation and transfer the heat to a working fluid which flows through an internal volume 61 of the tubes 57 via inlet and outlet manifolds 52. The tubes 57 are enclosed in a pressure conduit 48 which permits a secondary flow to reach the external surfaces of the tubes 57 to provide a means of dumping excess heat from the tubes when the flow of working fluid is unable to maintain the tubes below a maximum working temperature and/or pressure. Alternatively, the need to dump excess heat may arise due to local hot spots in the receiver due to poor alignment of heliostats. Under such conditions, a secondary cool stream is circulated through the conduit 48 to cool the tubes 57. The secondary cool stream may be obtained from ambient air or from a source supplied through a secondary fluid network with manifolds and other suitable piping or ducting. In an alternative embodiment, the secondary cooling stream is conveyed through the tube interiors 61 and the working fluid is conveyed external to the tubes 57.

Preferably, in the various disclosed embodiments, the interior walls 50 of the conduit (excluding the window) are constructed of a reflective material in order that radiation not directly absorbed by the transparent, translucent, and/or at least partially opaque tubes 57 will be absorbed within the conduit 48 and largely radiated back to the tubes 57.

Figure 8:
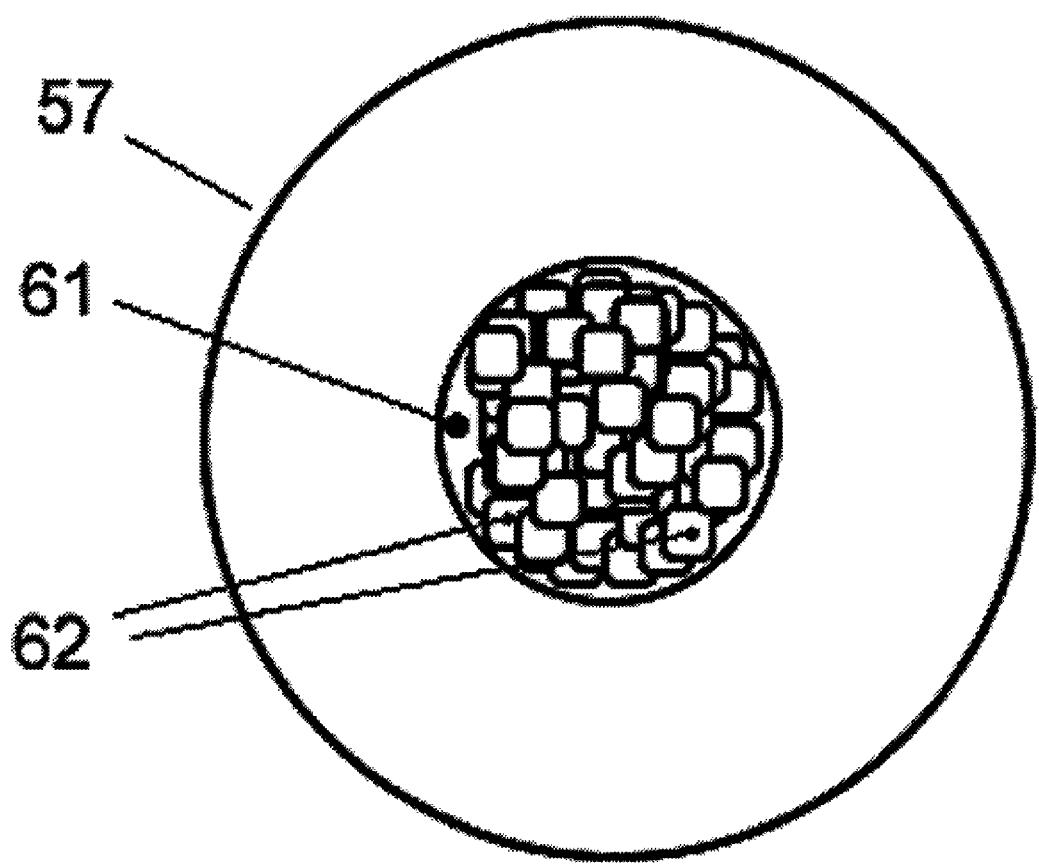
FIG. 8 is a cross-section of a transparent, translucent or partially opaque tube in the interior volume of which is a bed of elements including additional transparent, translucent, and/or at least partially opaque elements.

FIG. 8 shows the embodiment, in which the interior volume 61 of a transparent, translucent, and/or at least partially opaque tube 57 contains a bed of elements 62, including additional transparent, translucent, and/or at least partially opaque elements, to provide additional energy absorbing and heat transferring material without adversely affecting the transparency of the tubes 57. This is essentially based on the broader concept discussed above of providing multiple pressure conduits, each containing a bed of transparent, translucent, and/or at least partially opaque elements. In this embodiment, the bed of elements also acts to cause generate greater turbulence in the working fluid, thereby reducing resistance to convection caused by boundary layer development. As in the other embodiments, the elements in the bed can be treated to provide a selected degree of absorptivity.

Figure 9:
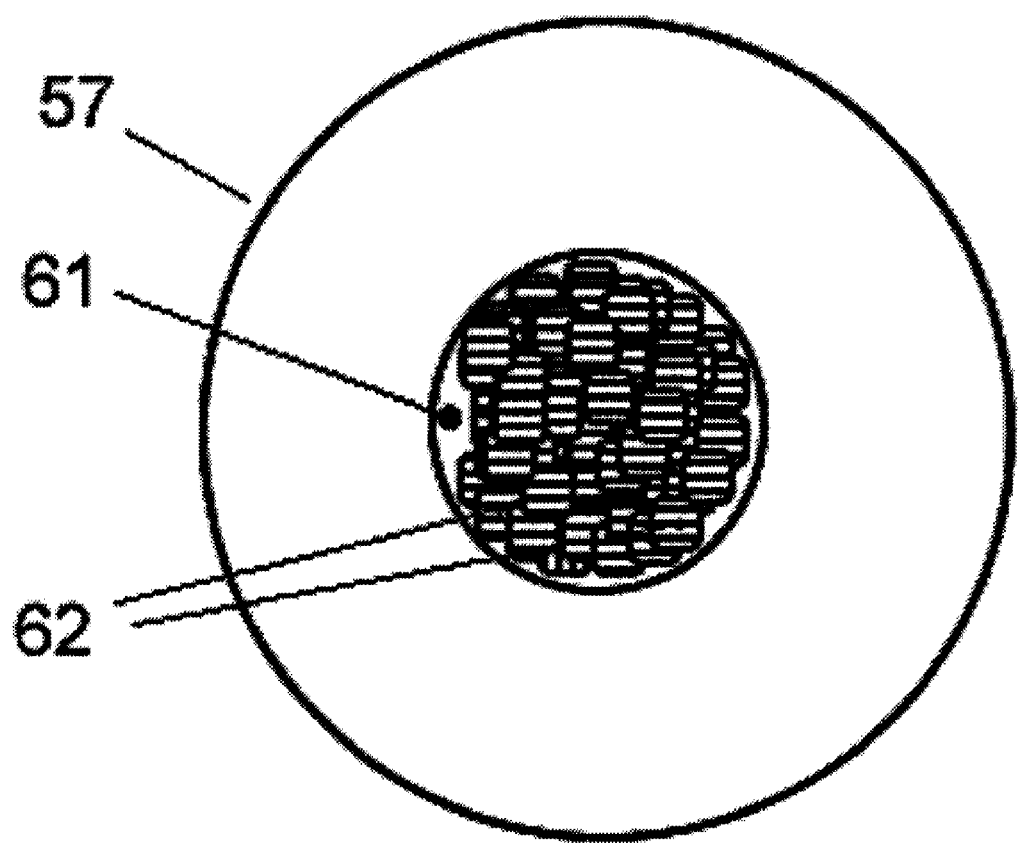
FIG. 9 is a cross-section of a transparent, translucent or partially opaque tube in the interior volume of which is a bed of elements including largely opaque elements.

In an alternative embodiment, it may be desirable to reduce the transparency of a tube and further increase its heat absorption and transfer capabilities, and this is accomplished, for example, by introducing a bed of partly opaque elements, including, in one aspect of the embodiment, ceramic elements, in the interior space of a tubes, as shown in FIG. 9. A mixture of opaque and transparent elements may also be used in an alternative embodiment.

Figure 10:
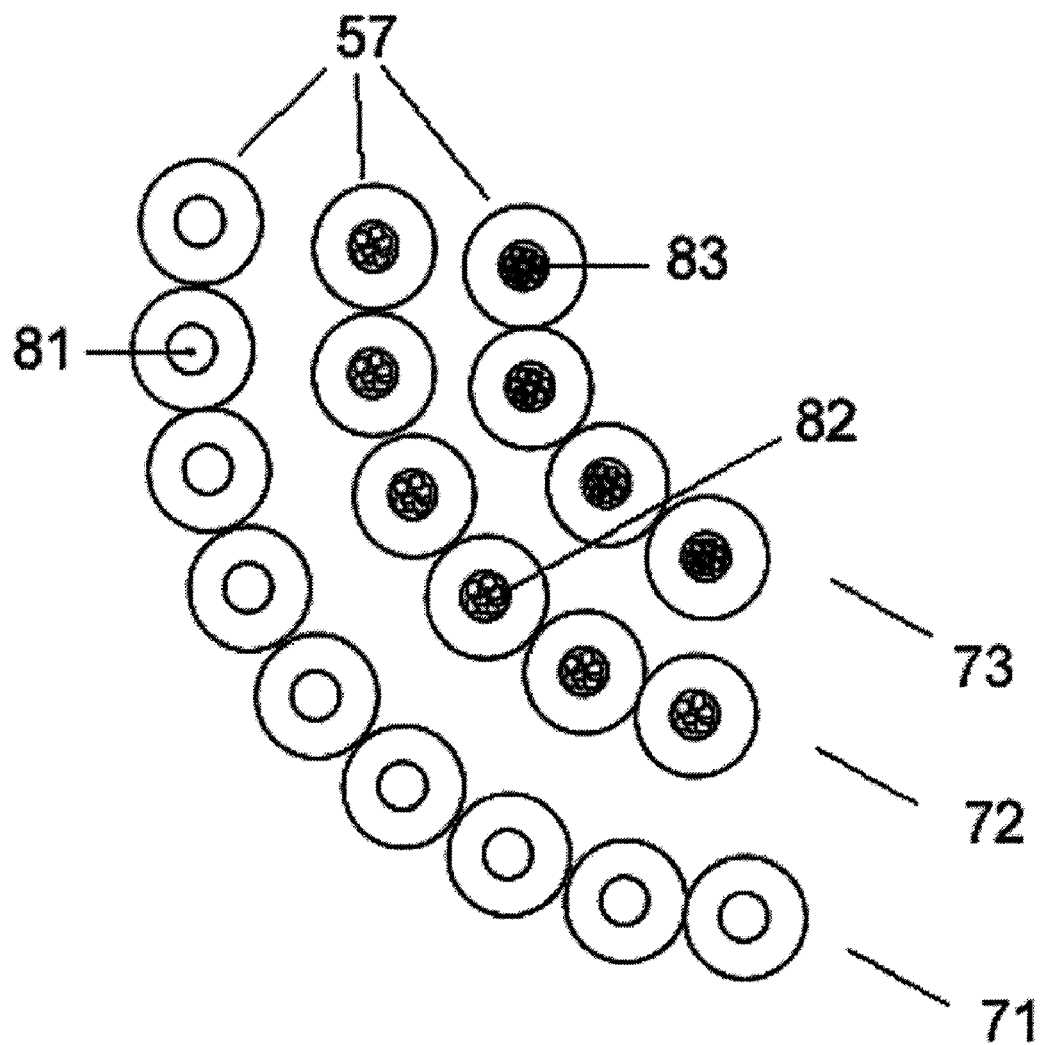
FIG. 10 is a partial cross-sectional view of a receiver containing tubes according to another embodiment.

Referring now to FIG. 10, an embodiment has multiple tubes filled with radiation absorbing elements and is configured to adjust the absorption rate according to the depth from the radiation admitting aperture. In the partial view of a receiver in FIG. 10, tubes 57 containing substantially transparent elements 81 are installed in an outer arc 71, i.e., closer to the opening of the conduit in the direction of the heliostats, so that most of the light radiation passes through this outer arc 71, and tubes 57 containing substantially opaque elements 83 in an inner arc 73 so that most or all of the remaining light radiation is absorbed in this inner arc 73. Optionally, additional intervening arcs 72 are installed between the outer and inner arcs, 71, 73, respectively, where the level of opacity of the elements contained in the tubes of an intervening arc is greater than that of more outer arcs and less than that of more inner arcs. Note that although light is shown in this embodiment as entering through an arc, the configuration could be modified such that light enters over a 360 degree interval (such as with a cylinder-shaped receiver) or through a flat prism-shaped receiver. Thus, the concept of layering as shown is not limited to the particular geometry shown.

Figure 11:
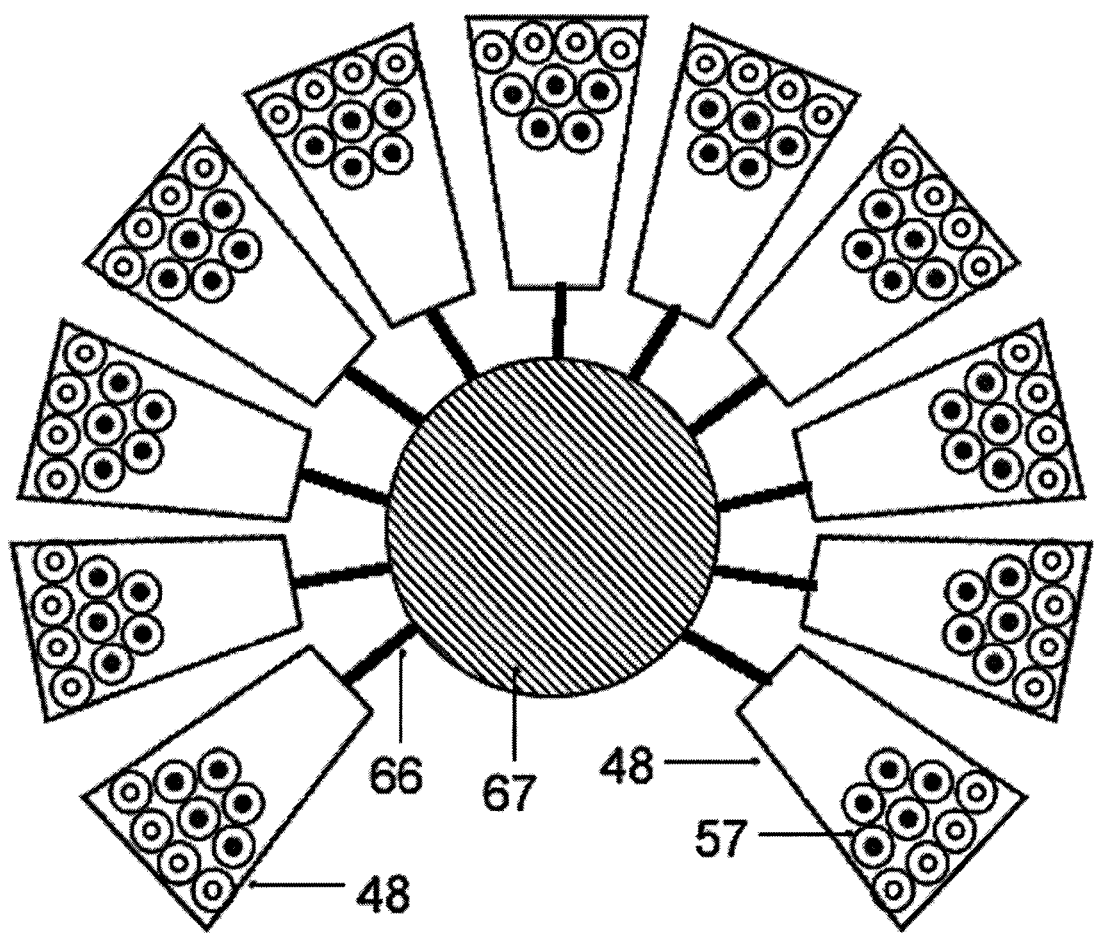
FIG. 11 is a cross-sectional plan view of a receiver comprising several conduits that include tubes in accordance with a further embodiment.

In a further embodiment, shown in FIG. 11, a receiver includes a plurality of conduits where each conduit faces a different group of heliostats and receives reflected solar radiation therefrom, as illustrated in FIG. 11. The conduits can incorporate any of the previously described embodiments. FIG. 11 illustrates an embodiment in which several conduits 48 include tubes 57 arranged to permit light to be focused thereon from a range of azimuthal angles cumulatively totaling at least 180 degrees. Pipes 66 retrieve heated working fluid from each conduit 48 to a central manifold (not shown) in a central manifold housing 67. In an alternative further embodiment, the conduits may be at different heights in order to prevent blocking of reflected radiation directed to them.

Figure 12:
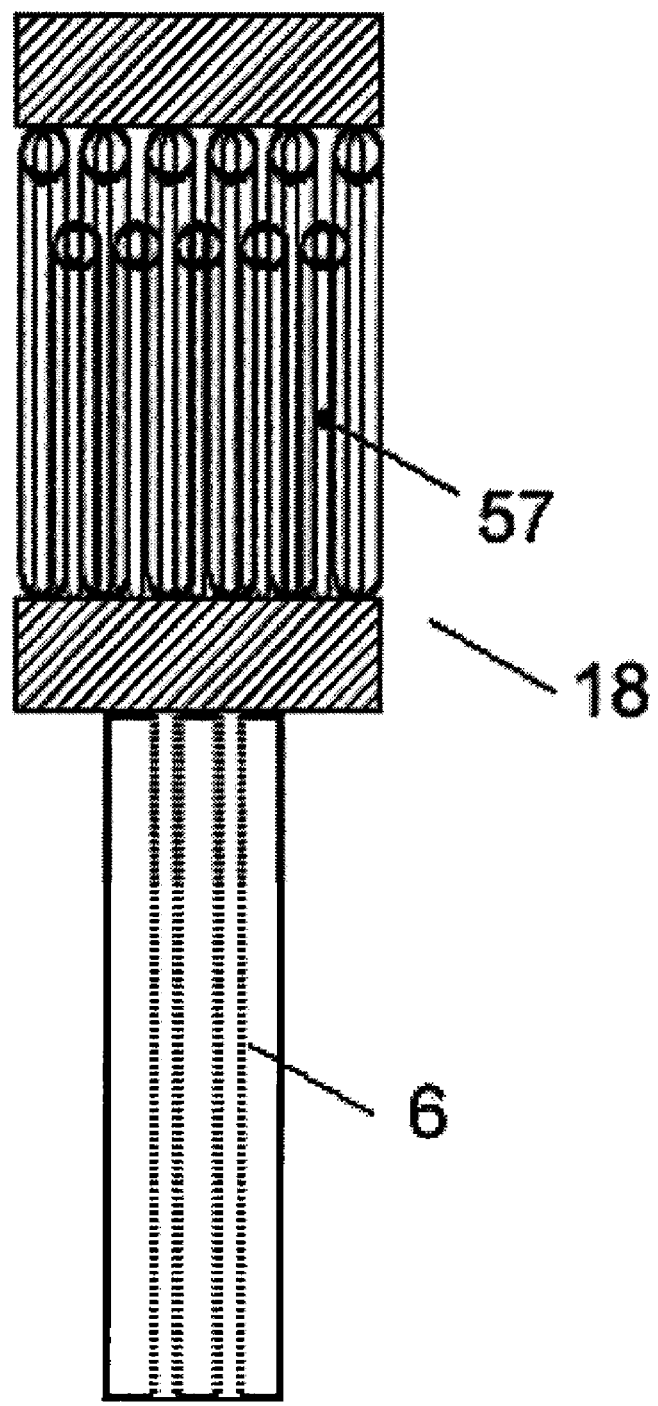
FIGS. 12 and 13 are elevation views of receiver according to a preferred embodiment.

In another preferred embodiment, the heat-absorbing transparent, translucent, and/or at least partially opaque elements comprise a plurality of transparent, translucent, and/or at least partially opaque tubes not provided in a conduit, where a pressurized working fluid is made to flow through the interior volumes of the tubes and thereby absorb heat, and a receiver includes at least one cylindrical ring of such tubes. In one aspect, as illustrated in FIG. 12, this configuration eliminates the need for an outer surface or housing for receiver 18, as the tubes 57 are pressurized and there is no need for a pressurized housing, and furthermore the addition of an outer surface or housing, which cannot be perfectly transparent, will decrease radiation at the tubes and increase radiative heat losses from the outer surface.

Figure 13:
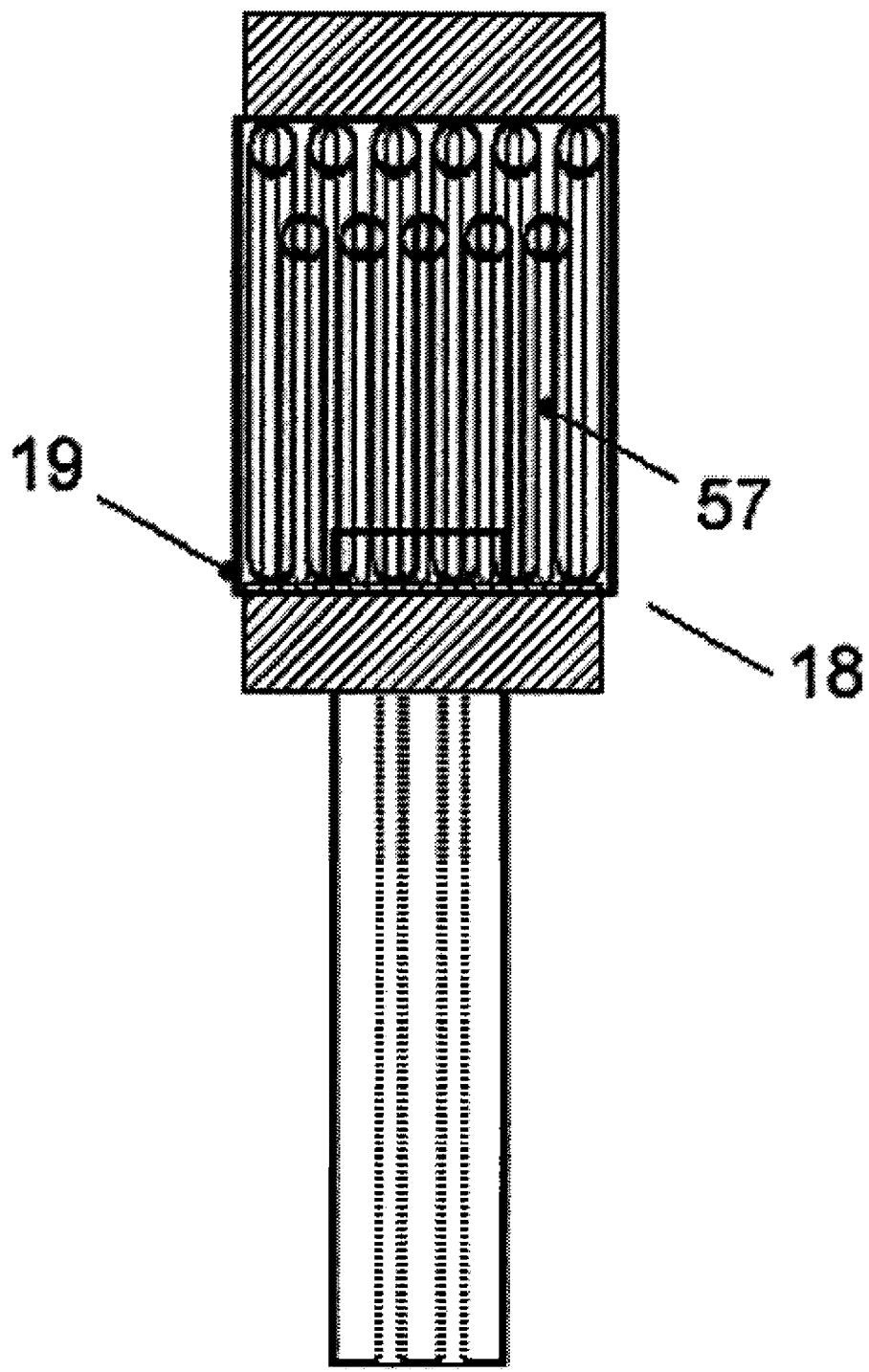
Figure 14:
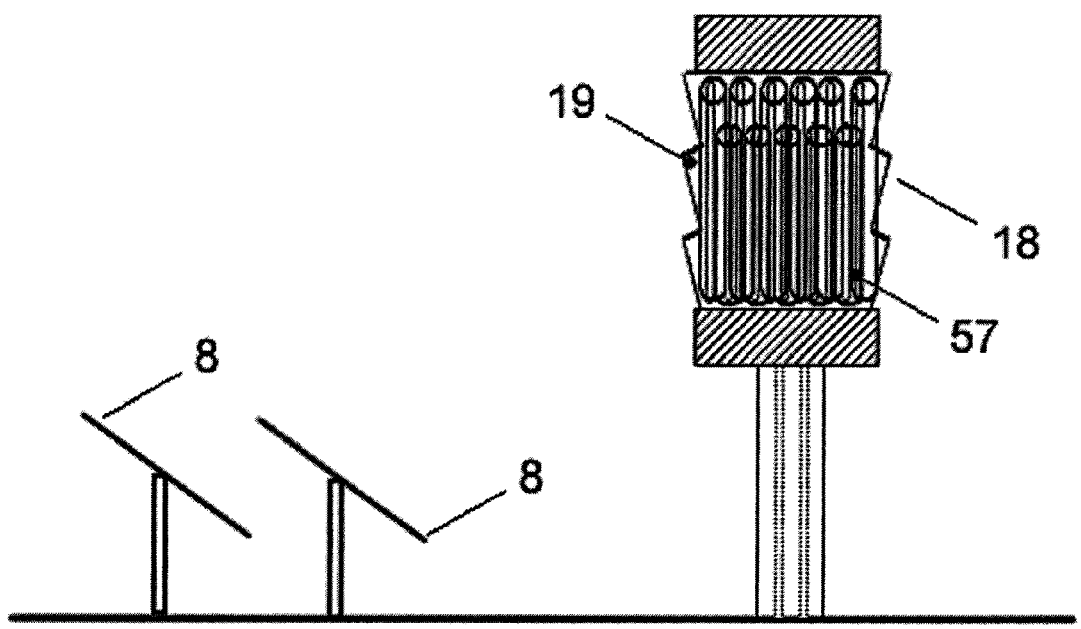
FIG. 14 is diagrammatic view of a plurality of heliostats and a receiver according to another aspect of the embodiment.

In another aspect, illustrated in FIG. 13, the receiver 18 includes an outer housing 19 of a substantially transparent material such as sapphire or a transparent ceramic material such as nanocrystalline or polycrystalline magnesium aluminate, provided in order to permit the introduction of a heat-absorbing fluid (not shown) which is introduced into the receiver housing 19 at a lower temperature than the tubes 57 and transfers heat from the tubes 57 by convection, for evacuation from the housing 19 through pipes or conduits 6. The housing can be either cylindrical as illustrated, or can be an upwardly opening conical section or a housing whose surface is terraced as shown in FIG. 14 such that the normal of the outer surface of the housing 19, as discussed earlier, is aimed (i.e., the surface normal is aimed) generally at the heliostat-mounted mirrors 8 which reflect light toward the surface.

Figure 15:
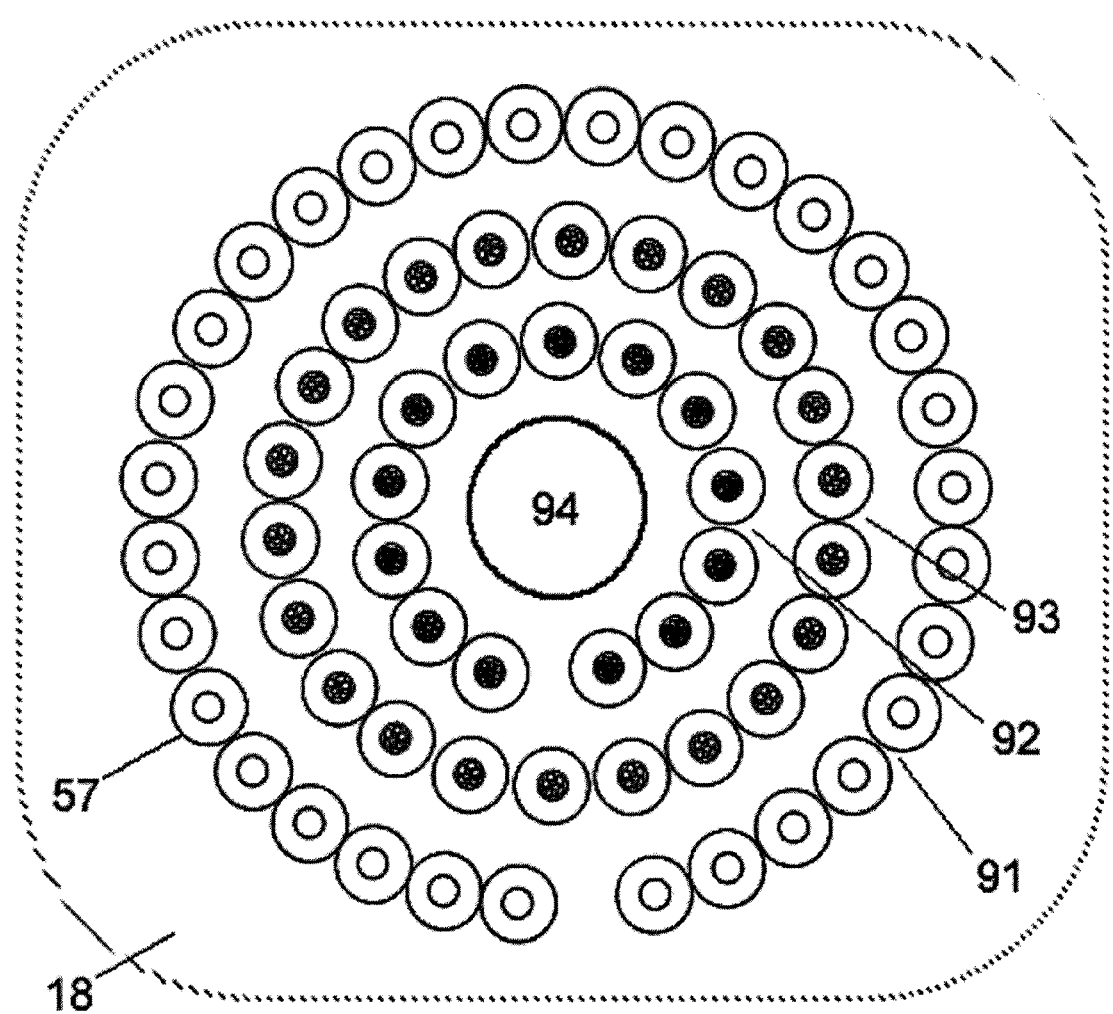
FIG. 15 is a cross-sectional plan view of a receiver according to a preferred aspect.

In a preferred embodiment, illustrated in FIG. 15, the receiver 18 includes at least an outer ring 91 and an inner ring 92 of tubes 57, where each ring of tubes is positioned so that each tube in all but the outer ring is, to the extent practical, located behind the gap between adjacent tubes in an outer ring, thus ensuring that substantially no stray reflected solar radiation avoids passing through any heat-absorbing transparent, translucent, and/or at least partially opaque tubes. The energy absorption and heat transfer enhancements discussed previously with respect to all previous embodiments, including those illustrated in FIGS. 8, 9 and 10, can be incorporated here as well. In another preferred aspect, at least one intervening row 93 is installed between the outer and inner rows, 92, 91, respectively, where the level of opacity of the elements contained in the tubes of an intervening arc is greater than or equal to that of more outer arcs and less than that of more inner arcs. In a further preferred aspect, an inner cylindrical wall 94 is constructed of a heat-absorbing material in order that radiation not directly absorbed by the transparent, translucent, and/or at least partially opaque tubes will be absorbed within the receiver and largely radiated back to the tubes. Optimally the inner cylindrical wall includes high-temperature ceramic as a coating or as a construction material.

Figure 16A:
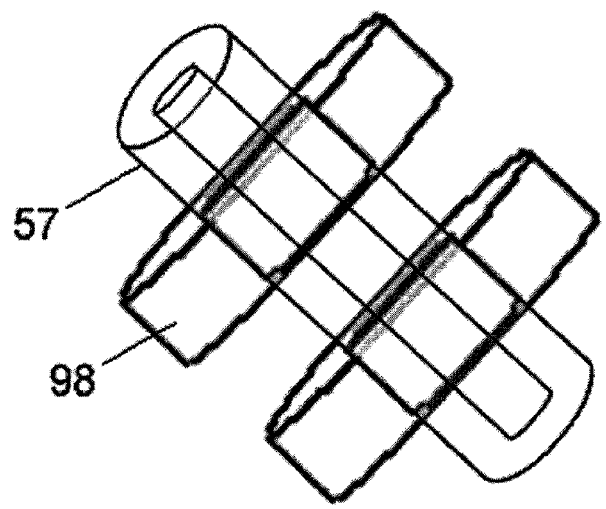
FIGS. 16a, 16b and 16c are isometric views of a transparent, translucent or partially opaque tube and various forms of mechanical support.
Figure 16B:
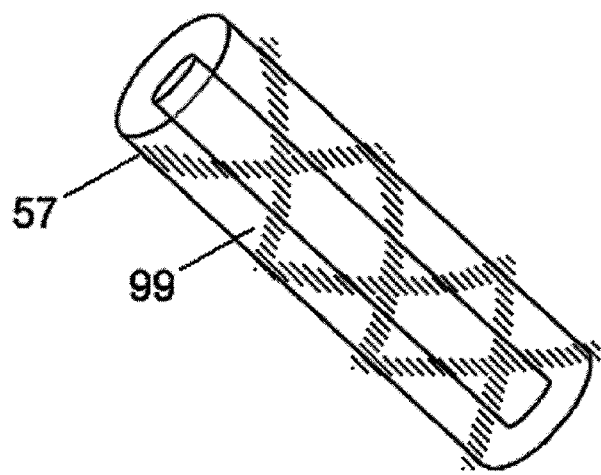
Figure 16C:
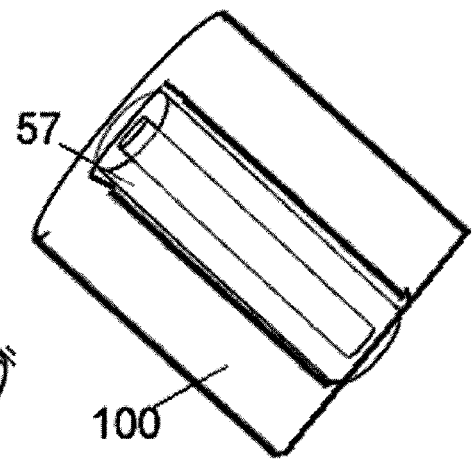
Figure 17A:
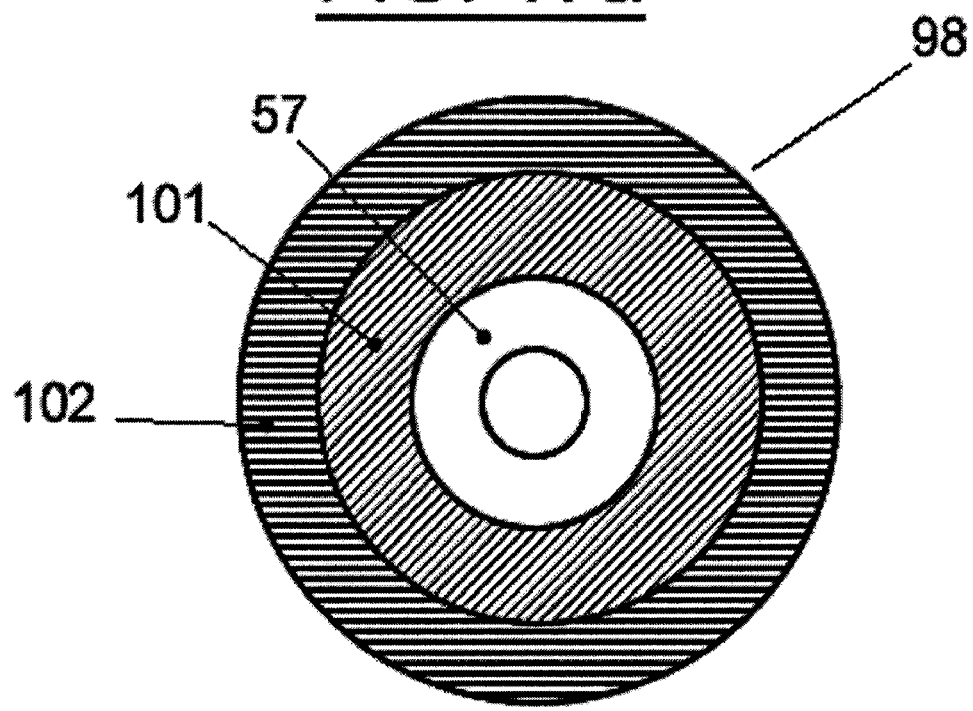
FIG. 17a is a cross-section of an insulated mechanical support ring and a transparent, translucent or partially opaque tube.
Figure 17B:
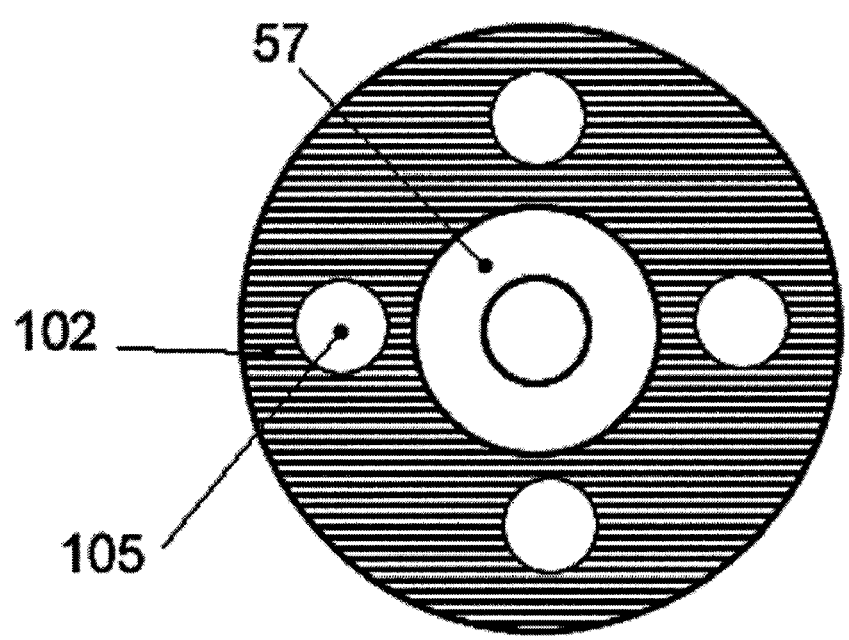
FIG. 17b is a cross-section of a cooled, mechanically supported transparent, translucent or partially opaque tube.

In preferred embodiments, the pressurized working fluid is compressed air at a pressure of at least 10 bar. However, it is desirable from the standpoint of Brayton cycle efficiency to provide heated compressed air at a pressure of at least 20 to 30 bar, and even more preferable to reach the range of 40 to 60 bar. Therefore, according to yet another preferred embodiment, transparent, translucent, and/or at least partially opaque tubes used for flowing pressurized working fluid therein will require mechanical reinforcing in order to allow the tubes to withstand such a high pressure. Mechanical reinforcement is provided in the form of support rings 98 on the outside of each tube 57, as shown in FIG. 16a, or as helical windings 99, as shown in FIG. 16b, or as cylindrical recesses 100, as shown in FIG. 16c. The mechanical reinforcement is provided in a material that is suitable in terms of mechanical strength and temperature, such as titanium, or alternatively in a combination of materials where an insulating layer 101, for example of a ceramic material, is interposed between a steel element in an outer layer 102 and the tube 57, as illustrated in FIG. 17a, which shows a cross-sectional view of a support ring 98 with such a composition. The mechanical reinforcement can also be used as a means for removing excess or non-uniform heat from a tube by providing a conduit 105 within the mechanical support for a heat-absorbing fluid, as illustrated in FIG. 17b. Reinforcement may be provided in composite structures in which reinforcing winds or layers are embedded in the matrix of the tubes. Such reinforcements may serve entirely, or partly, in the role of helping to adjust the rate of absorption of solar radiation of the tubes. Thus, the density of reinforcing winds may serve the additional role of adjusting the absorption rate of the particular tube so that inner tubes would have higher density of reinforcing winds than outer tubes, according to the teachings above.

Figure 18:
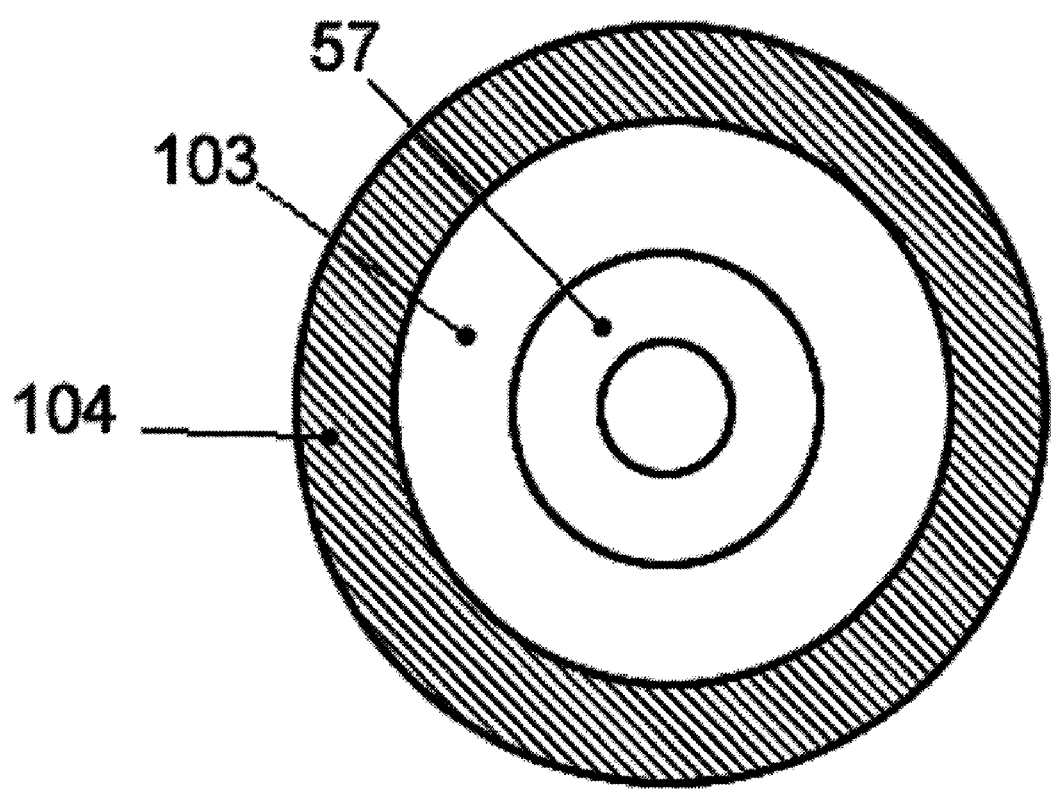
FIG. 18 is a cross-section of a cooled transparent, translucent or partially opaque tube.

Referring now to FIG. 18, in another receiver embodiment, excess or non-uniform heat is removed by a heat-absorbing fluid introduced into the space 103 between an inner transparent, translucent, and/or at least partially opaque tube 57 and an outer transparent, translucent, and/or at least partially opaque tube 104. In another alternative embodiment, excess of non-uniform heat is removed by a heat-absorbing fluid that is added to the pressurized working fluid flowing through a transparent, translucent, and/or at least partially opaque tube. In both alternative embodiments, the heat-absorbing fluid is at least partially transparent. In a preferred embodiment, the heat-absorbing fluid is water vapor.

To operate a receiver in an efficient manner it is desirable to ensure uniform solar flux and uniform temperature across any one group of tubes. One way to accomplish this is not to introduce the working fluid to the high-temperature tubes at a very low temperature, but rather to preheat the fluid in another group of tubes. In another preferred embodiment, a receiver is provided in which a pressurized working fluid is heated to a first lower temperature in a first receiver portion, for example a first set of tubes constructed of an opaque material, and then further heated in a second receiver portion, for example, multiple layers of transparent, translucent, and/or at least partially opaque tubes to a second temperature according to the teachings of the receiver embodiments described above. In a preferred aspect, the lower temperature range is at least 1,000-1100° K. and the second temperature is at least 1,450° K. or higher.

Figure 19:
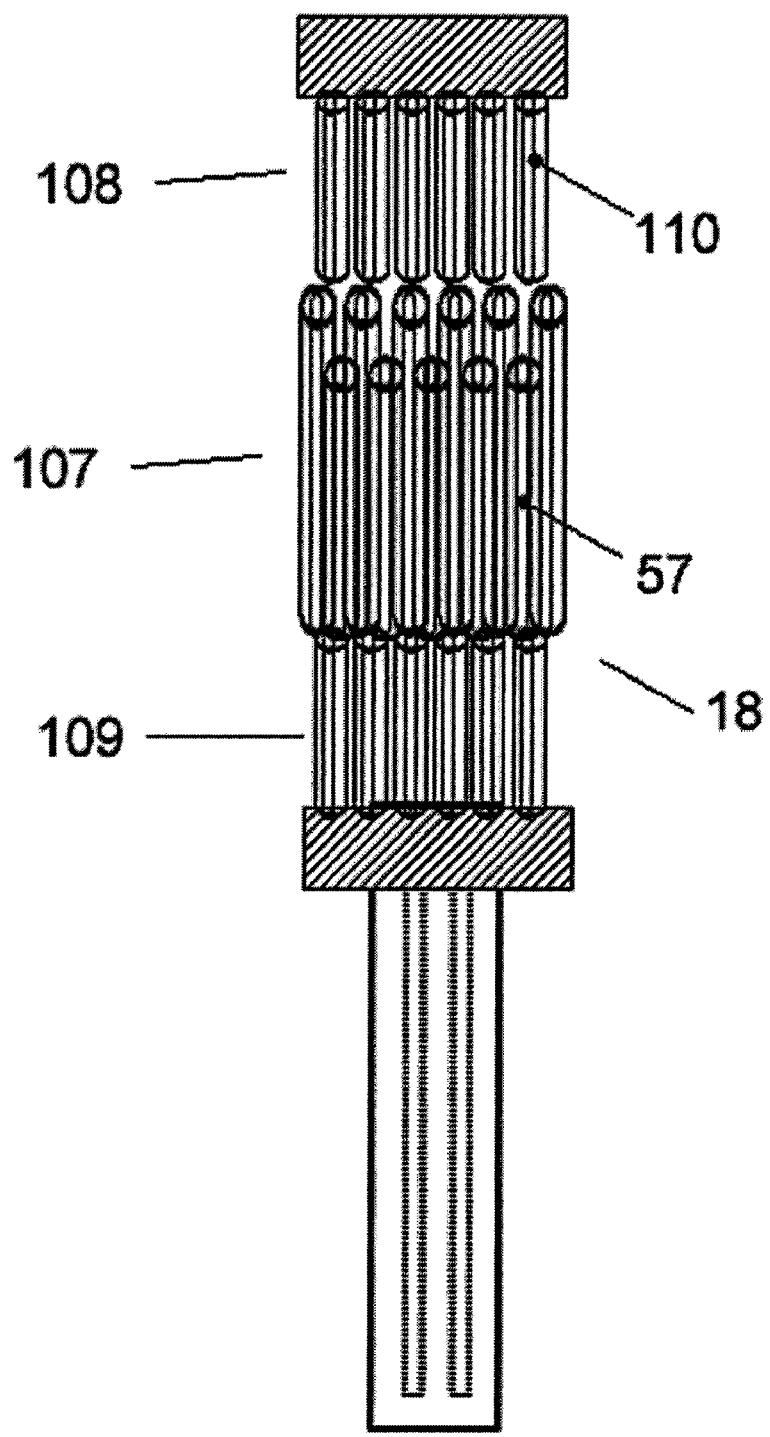
FIG. 19 is an elevation view of a receiver provided in accordance with another preferred embodiment.

FIG. 19 illustrates another preferred embodiment in which is provided a receiver 18 that includes a cylindrical bank 107 of transparent, translucent, and/or at least partially opaque tubes 57, and that additionally includes at least one of two cylindrical banks 108, 109 of opaque metal tubes 110, one of which is located higher than the bank of transparent, translucent, and/or at least partially opaque tubes and the other of which is located lower. Optimally both the higher and lower bank of opaque tubes 108, 109, respectively, will be provided to take advantage of the typical Gaussian distribution of aiming errors of heliostats directing reflected solar radiation onto a receiver and specifically onto the central, higher-temperature transparent, translucent, and/or at least partially opaque tube bank 107; much of the solar radiation reflected onto the higher and lower banks will inevitably be that of heliostats that are actually aiming at the central bank due to this aiming error. Moreover, it is preferable that the lower-temperature preheating banks be positioned higher and lower than the higher-temperature central bank, because then proportionally fewer heliostats be aimed at the higher and lower banks of the receiver, where aiming error will cause some reflection aimed at the higher and lower banks to miss the receiver entirely. The opaque tubes can be made of a metal appropriate for the temperature range, such as a molybdenum-chrome alloy of steel. A working fluid at between ambient temperature and the first temperature of at least 1,073° K. is introduced into the banks of opaque tubes, and from there is routed to the transparent, translucent, and/or at least partially opaque tube bank where it is heated to the second temperature of at least 1,473° K.

Figure 20:
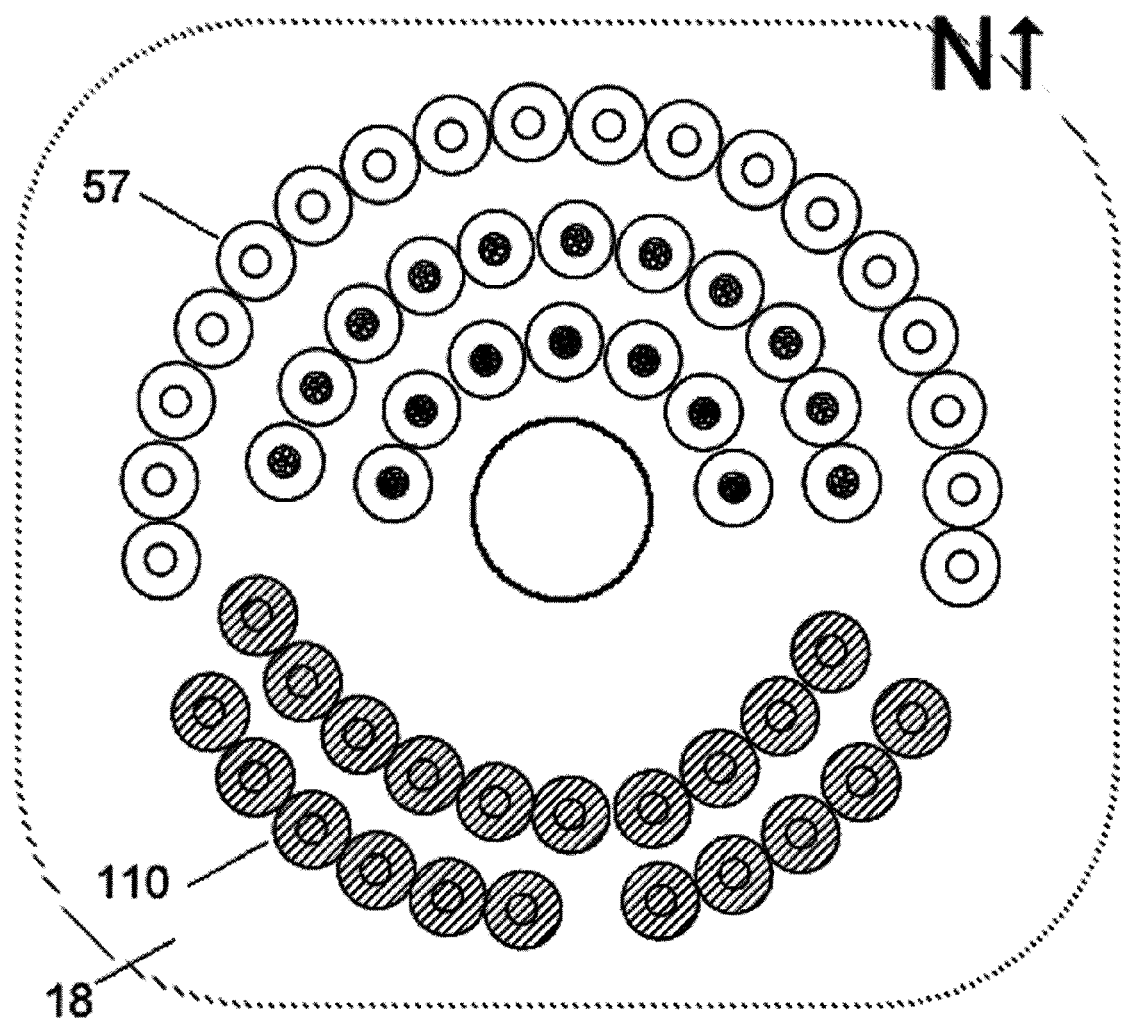
FIG. 20 is a cross-sectional plan view of another receiver provided in accordance with another embodiment.

FIG. 20 illustrates another embodiment in which is provided a receiver 18 that includes a single cylinder of tube banks, where the opaque metal tubes 110 and the transparent, translucent, and/or at least partially opaque tubes 57 are along separate sections of the circumference of the receiver. In the northern hemisphere, a heliostat-mounted mirror located to the north of a receiver will generally and in aggregate reflect more incident solar radiation onto a receiver than a heliostat-mounted mirror located the same distance from the same receiver but to the south of it, and this is because the sun is always located in the southern hemisphere of the sky and the cosine of the angles of radiation incidence and reflection for north-positioned heliostats is relatively smaller than for south positioned-heliostats, which yields higher utilization of incident solar radiation. Therefore, in this embodiment, opaque metal tubes which heat a pressurized working fluid to a lower temperature are provided largely in the southernmost segment of the circumference of the receiver, and the transparent, translucent, and/or at least partially opaque tubes are provided largely in the northernmost segment of the circumference of the receiver.

Certain features of this invention may sometimes be used to advantage without a corresponding use of the other features. While a specific embodiment of the invention has been shown and described in detail to illustrate the application of the principles of the invention, it will be understood that the invention may be embodied otherwise without departing from such principles.

Figure 21:
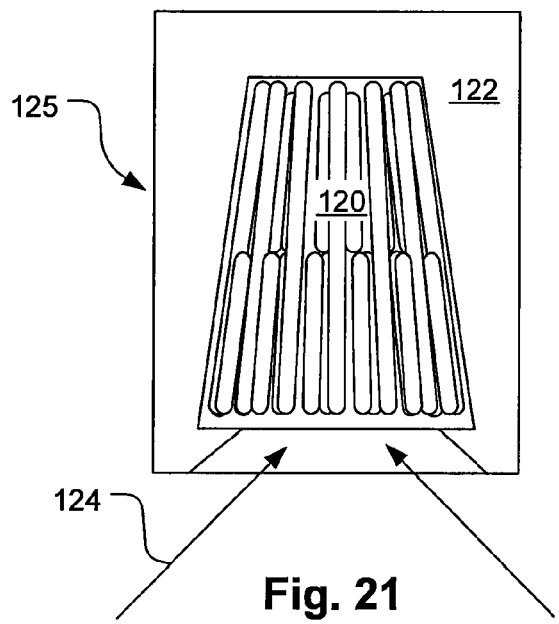
FIG. 21 illustrates a cavity receiver with various features of the above-described embodiments.

Although most of the embodiments are described in terms of outwardly-facing receiver portions, it is possible to employ the features described in a cavity-type receiver. For example, in FIG. 21, a cavity receiver 125 has layers of tubes 120 which increase in radiation opacity with outwardly increasing radius, since incoming radiation 124 from heliostats enters from the center. An insulating cap 122 is shown.

Figure 22:
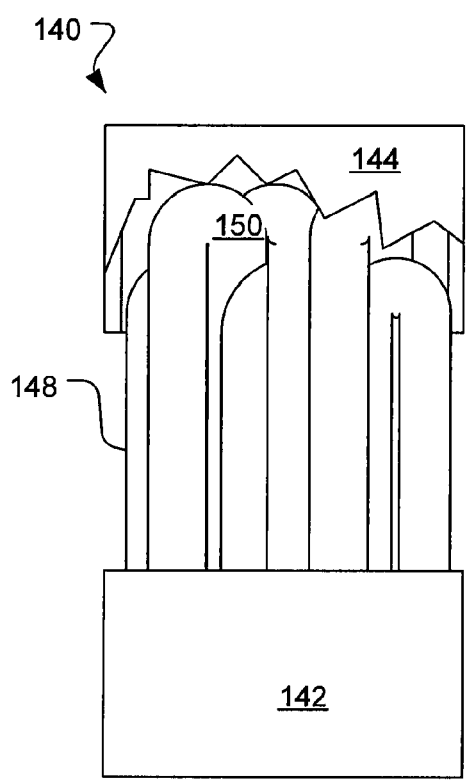
FIG. 22 illustrates features of a receiver with a 360 degree receiving aperture.

FIG. 22 illustrates a feature which may be used with various embodiments described above. The receiver 140 is open on all sides with heat absorbing elements 148 (preferably tubes) providing support for a return manifold 150, at the top, with an insulating canopy 144. The base 142 may be supported on a tower. The return manifold 150 may consist simply of return bends for each tube 148. The return bends may be of different material from the tubes that absorb concentrated sunlight.

Figure 23:
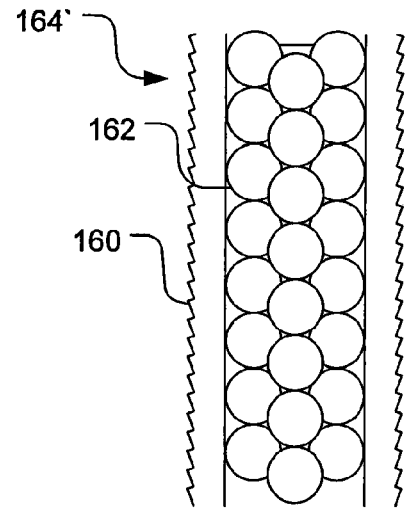
FIG. 23 illustrates a receiver, or portion thereof, with light absorbing elements in a regular array.

Although the embodiments in which radiation-absorbing elements have been illustrated, the array of elements can be random or not. For example, as shown in FIG. 23, dumbbell shaped elements 162 are stacked in a regular arrangement within a pressure conduit 164, which may be a tube. One or more such conduits 164 may make up a receiver. Also, angled steps 160 forming a terraced surface are shown which may provide surfaces that are aimed at the heliostats to reduce the angle of incidence. In this embodiment, the steps may be small and formed by, for example, mechanical etching or molding.

Figure 24:
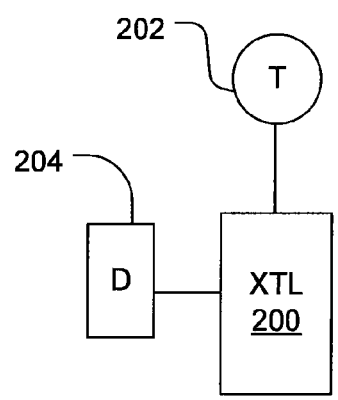
FIG. 24 shows control elements for controlling the flow of secondary coolant.

Referring to FIG. 24, in the embodiments in which a cooling fluid can be used to cool the receive to eliminate local hot spots or to dump excess heat, a controller 200 is preferably provided with temperature sensors 202 located at various locations to detect temperatures at parts of the receiver. Preferably, the controller is configured to control a valve, pump, or other final controller 204 to cause coolant to flow in the receiver to effect cooling.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

The invention claimed is:

1. A solar receiver for a concentrating solar collection system, comprising:

a receiver portion having an array of tubes, at least some of which are at least partially transparent, the receiver portion being disposed such that the array of tubes receives concentrated solar energy, each tube having a first inlet and a first outlet so as to define a first flow channel therebetween for conveying a working fluid, the first inlet configured to introduce the working fluid into the first flow channel from an inlet pipe, the first outlet configured to evacuate the working fluid from the first flow channel to an outlet pipe; and a second flow channel for conveying a cooling fluid in thermal contact with the tubes, the second flow channel being defined between a second inlet and a second outlet, wherein the cooling fluid conveyed by the second flow channel cools the working fluid conveyed by the first flow channel further comprising a controller configured to detect temperatures of the tubes and to control the flow of cooling fluid responsively thereto.

2. The receiver of claim 1, wherein the second flow channel is a conduit and the array of tubes is disposed within the conduit between the second inlet and the second outlet.

3. The receiver of claim 1, wherein the second flow channel is a conduit having a reflective interior wall and at least a portion of the array of tubes is disposed within the conduit.

4. The receiver of claim 1, wherein each tube includes a bed of elements disposed in the first flow channel thereof, the bed of elements including transparent, translucent, or at least partially opaque components.

5. The receiver of claim 4, wherein said bed of elements includes ceramic elements.

6. A solar receiver for a concentrating solar collection system, comprising:

a receiver portion having an array of tubes, at least some of which are at least partially transparent, the receiver portion being disposed such that the array of tubes receives concentrated solar energy reflected from heliostats in the solar collection system, each tube having a first inlet and a first outlet so as to define a first flow channel therebetween for conveying a working fluid, the first inlet configured to introduce the working fluid into the first flow channel from an inlet pipe, the first outlet configured to evacuate the working fluid from the first flow channel to an outlet pipe;

a second flow channel for conveying a cooling fluid in thermal contact with the tubes, the second flow channel being defined between a second inlet and a second outlet, the second flow channel being configured such that the cooling fluid conveyed by the second flow channel cools the working fluid conveyed by the first flow channel; and a controller configured to control a flow of cooling fluid through the second flow channel so as to regulate temperature of the array of tubes.

7. The solar receiver of claim 6, wherein said controller is configured to detect temperatures of the tubes and to control the flow of cooling fluid responsively thereto.

8. The solar receiver of claim 6, wherein said controller is configured to control the flow of cooling fluid so as to maintain a uniform temperature for the tubes.

9. The solar receiver of claim 6, wherein said controller is configured to control the flow of cooling fluid so as to maintain the temperatures of the tubes below a predetermined maximum value.

10. A concentrating solar collection system comprising:

a plurality of heliostats, each heliostat being configured to track the sun and reflect incoming solar radiation;

a solar receiver arranged in a tower, the plurality of heliostats being arranged around at least a portion of the tower so as to direct reflected solar radiation onto the solar receiver, the solar receiver including:

an array of tubes, at least some of which are at least partially transparent, each tube having a first inlet and a first outlet so as to define a first flow channel therebetween for conveying a working fluid, the first inlet configured to introduce the working fluid into the first flow channel from an inlet pipe, the first outlet configured to evacuate the working fluid from the first flow channel to an outlet pipe the array of tubes receiving the reflected solar radiation so as to heat the working fluid conveyed through each first flow channel; and a second flow channel for conveying a fluid in thermal contact with the tubes, the second flow channel being defined between a second inlet and a second outlet and configured such that the fluid conveyed by the second flow channel cools the working fluid conveyed by the first flow channel; and a controller configured to control flow of fluid through the second flow channel so as to regulate temperature of the array of tubes.

11. The solar collection system according to claim 10, further comprising an electric power generating plant configured to generate electricity from heat stored in the working fluid conveyed through each first flow channel.

12. The solar collection system according to claim 10, wherein the second flow channel is defined by a housing, which surrounds said array of tubes.

13. The solar collection system according to claim 12, wherein said housing is a cylindrical housing.

14. The solar collection system according to claim 12, wherein said housing is a terraced conical housing having terraced surfaces, each terraced surface having a surface normal aimed at one of the plurality of heliostats.

* * * * *

UNITED STATES PATENT AND TRADEMARK OFFICE
CERTIFICATE OF CORRECTION

PATENT NO.       : 7,690,377 B2                                              Page 1 of 1
APPLICATION NO.  : 11/747595
DATED            : April 6, 2010
INVENTOR(S)      : Arnold Goldman et al.

It is certified that error appears in the above-identified patent and that said Letters Patent is hereby corrected as shown below:

Column 10, line 66, cancel the text beginning with "1. A solar receiver" to and ending with "responsively thereto." in column 11, line 20 and insert the following claim:

--1. A solar receiver for a concentrating solar collection system, comprising:
  a receiver portion having an array of tubes, at least some of which are at least partially transparent, the receiver portion being disposed such that the array of tubes receives concentrated solar energy,
  each tube having a first inlet and a first outlet so as to define a first flow channel therebetween for conveying a working fluid,
  the first inlet configured to introduce the working fluid into the first flow channel from an inlet pipe,
  the first outlet configured to evacuate the working fluid from the first flow channel to an outlet pipe; and
  a second flow channel for conveying a cooling fluid in thermal contact with the tubes, the second flow channel being defined between a second inlet and a second outlet,
  wherein the cooling fluid conveyed by the second flow channel cools the working fluid conveyed by the first flow channel, and further comprising a controller configured to detect temperatures of the tubes and to control the flow of cooling fluid responsively thereto.--

Signed and Sealed this

Twenty-fourth Day of August, 2010

David J. Kappos
*Director of the United States Patent and Trademark Office*